US012572544B1

(12) United States Patent

Pathak

(10) Patent No.: US 12,572,544 B1
(45) Date of Patent: Mar. 10, 2026

(54) MONITORING SEARCH PERFORMANCE FOR SCHEDULED SEARCHES AT A COMPONENT LEVEL GRANULARITY

(71) Applicant: Cisco Technology, Inc., San Jose, CA (US)

(72) Inventor: Jay A. Pathak, Newark, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 18/159,028

(22) Filed: Jan. 24, 2023

(51) Int. Cl.
*G06F 16/2453* (2019.01)
*G06F 16/2458* (2019.01)
*G06F 21/62* (2013.01)

(52) U.S. Cl.
CPC .... *G06F 16/24545* (2019.01); *G06F 16/2462* (2019.01); *G06F 21/6218* (2013.01)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |

| | | | |
|---|---|---|---|
| 2007/0143438 A1 | 6/2007 | Citrin et al. | |
| 2009/0106756 A1 | 4/2009 | Feng et al. | |
| 2010/0198806 A1 | 8/2010 | Graefe et al. | |
| 2013/0054582 A1 | 2/2013 | Macklem et al. | |
| 2015/0046530 A1 | 2/2015 | Mieritz et al. | |
| 2017/0124220 A1 | 5/2017 | Krueger et al. | |
| 2017/0220685 A1 | 8/2017 | Yan et al. | |
| 2019/0098106 A1 | 3/2019 | Mungel et al. | |
| 2019/0272271 A1* | 9/2019 | Bhattacharjee ..... G06F 16/2471 | |
| 2022/0027754 A1 | 1/2022 | Singh et al. | |

(Continued)

FOREIGN PATENT DOCUMENTS

JP 2006067129 A * 3/2006

OTHER PUBLICATIONS

Splunk Enterprise 8.0.0 Overview, available online, retrieved May 20, 2020 from docs.splunk.com.

(Continued)

*Primary Examiner* — Umar Mian
(74) *Attorney, Agent, or Firm* — Shook, Hardy & Bacon L.L.P.

(57) ABSTRACT

A computer-implemented method for tracking search performance includes executing a search query at a first computing device and computing a runtime for each of one or more components of the search query. The method also includes comparing a respective runtime for each of the one or more components with a respective threshold value, wherein the respective threshold value for each of the one or more components is based on a respective statistic determined using runtimes from prior executions of the search query. Further, responsive to determining that the respective runtime is higher than the threshold value, the method includes transmitting an alert to a second computing device in a cloud computing environment.

18 Claims, 15 Drawing Sheets

(56) References Cited

U.S. PATENT DOCUMENTS

| | | |
|---|---|---|
| 2022/0261287 A1 | 8/2022 | Dwivedi et al. |
| 2023/0077774 A1 | 3/2023 | Ocariza |
| 2023/0229659 A1* | 7/2023 | Beresniewicz ....... G06F 16/217 |
| | | 707/718 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

Final Office Action received for U.S. Appl. No. 18/159,025 dated Sep. 10, 2024, 20 pages.

Non Final Office Action received for U.S. Appl. No. 18/159,025 dated Jun. 4, 2024, 20 pages.

* cited by examiner

1300

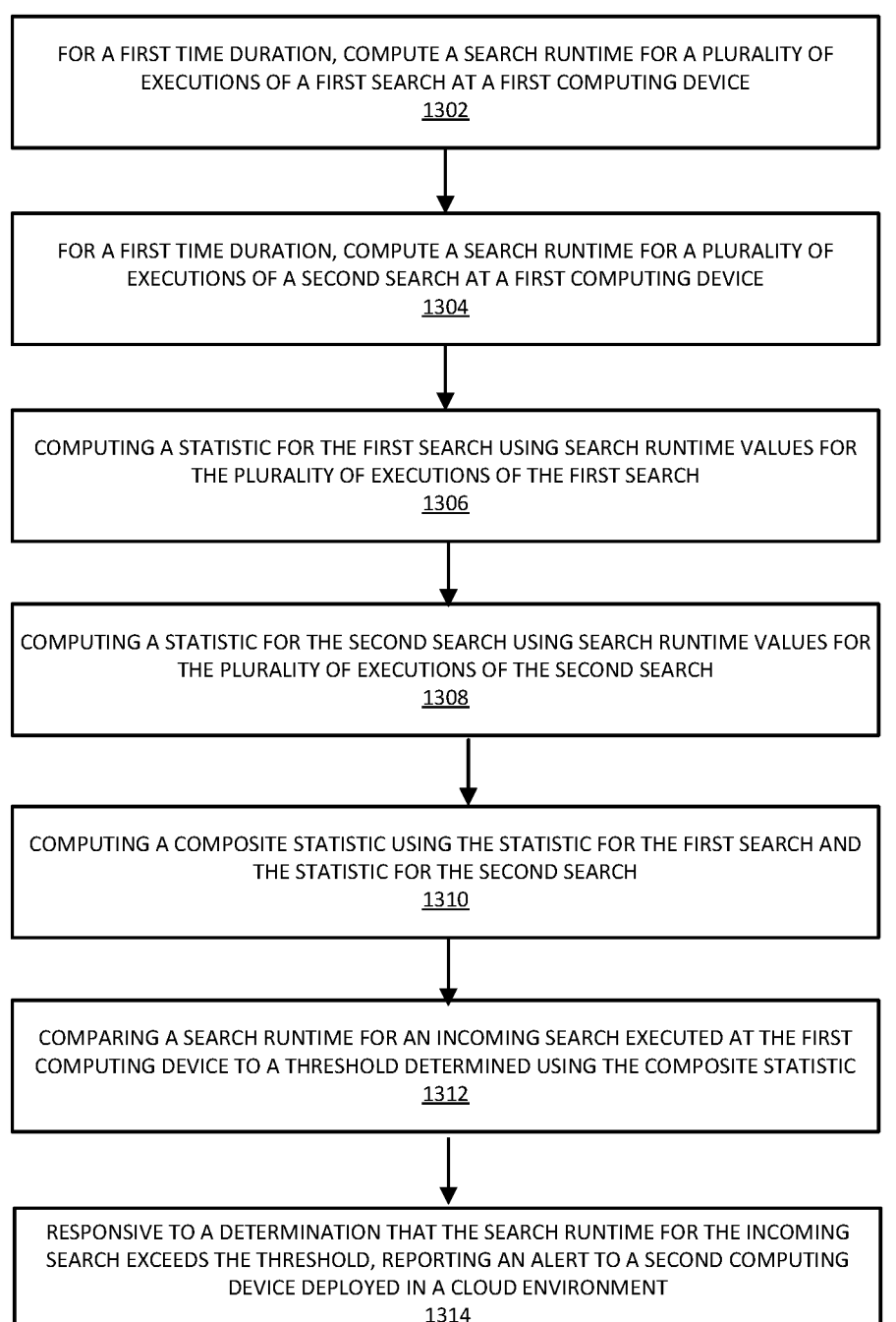

FOR A FIRST TIME DURATION, COMPUTE A SEARCH RUNTIME FOR A PLURALITY OF EXECUTIONS OF A FIRST SEARCH AT A FIRST COMPUTING DEVICE
1302

FOR A FIRST TIME DURATION, COMPUTE A SEARCH RUNTIME FOR A PLURALITY OF EXECUTIONS OF A SECOND SEARCH AT A FIRST COMPUTING DEVICE
1304

COMPUTING A STATISTIC FOR THE FIRST SEARCH USING SEARCH RUNTIME VALUES FOR THE PLURALITY OF EXECUTIONS OF THE FIRST SEARCH
1306

COMPUTING A STATISTIC FOR THE SECOND SEARCH USING SEARCH RUNTIME VALUES FOR THE PLURALITY OF EXECUTIONS OF THE SECOND SEARCH
1308

COMPUTING A COMPOSITE STATISTIC USING THE STATISTIC FOR THE FIRST SEARCH AND THE STATISTIC FOR THE SECOND SEARCH
1310

COMPARING A SEARCH RUNTIME FOR AN INCOMING SEARCH EXECUTED AT THE FIRST COMPUTING DEVICE TO A THRESHOLD DETERMINED USING THE COMPOSITE STATISTIC
1312

RESPONSIVE TO A DETERMINATION THAT THE SEARCH RUNTIME FOR THE INCOMING SEARCH EXCEEDS THE THRESHOLD, REPORTING AN ALERT TO A SECOND COMPUTING DEVICE DEPLOYED IN A CLOUD ENVIRONMENT
1314

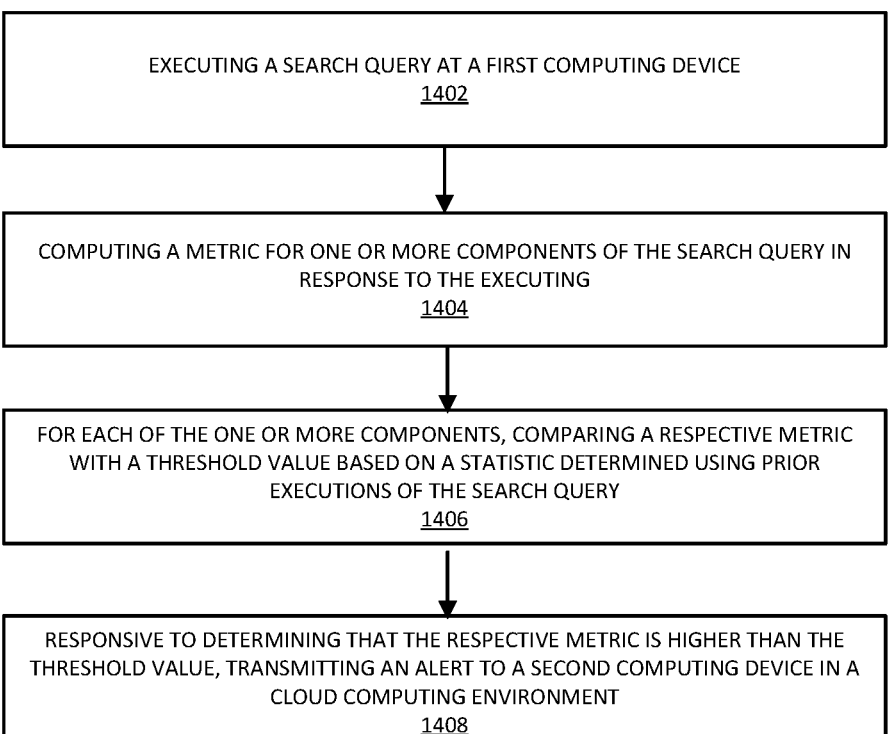

EXECUTING A SEARCH QUERY AT A FIRST COMPUTING DEVICE
1402

COMPUTING A METRIC FOR ONE OR MORE COMPONENTS OF THE SEARCH QUERY IN RESPONSE TO THE EXECUTING
1404

FOR EACH OF THE ONE OR MORE COMPONENTS, COMPARING A RESPECTIVE METRIC WITH A THRESHOLD VALUE BASED ON A STATISTIC DETERMINED USING PRIOR EXECUTIONS OF THE SEARCH QUERY
1406

RESPONSIVE TO DETERMINING THAT THE RESPECTIVE METRIC IS HIGHER THAN THE THRESHOLD VALUE, TRANSMITTING AN ALERT TO A SECOND COMPUTING DEVICE IN A CLOUD COMPUTING ENVIRONMENT
1408

FIG. 14

MONITORING SEARCH PERFORMANCE FOR SCHEDULED SEARCHES AT A COMPONENT LEVEL GRANULARITY

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive and continues to grow rapidly. This technological evolution can give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to store, search and analyze the data in a performant way.

One of the technical challenges with searching data is characterizing search performance. Characterizing search performance has historically been a challenging task due to the multitude of factors that can affect search execution including the different sources of noise that can influence search performance and the concomitant customer experience. To determine search performance, conventional query systems associated with IT environments typically only observe the overall time taken for the search and in particular, the time between when a search is dispatched (which in some cases may include the time it takes to type a search into the user interface) to when a search result is delivered (which in some cases may include the time it takes to display the search results in the user interface).

The total search runtime, however, is highly variable and serves as an unreliable metric because the search runtime is a function of many factors, including search concurrency, number of saved searches configured, search time range, search schedule and frequency, number of indexes searched, volume of events in each index searched, size and number of lookup tables, number and types of commands in the search language, presence and complexity of custom search commands, type of hardware including number of CPU cores, etc. Conventional query systems are simply unable to isolate a degradation in search runtime to one or more of the several factors that can influence the overall runtime.

BRIEF DESCRIPTION OF THE DRAWINGS

Illustrative examples are described in detail below with reference to the following figures:

FIG. 13 is a flowchart illustrating an example of a computer-implemented method of tracking and reporting a search performance for an incoming search, in implementations according to the present disclosure.

FIG. 14 is a flowchart illustrating an example of a computer-implemented method of tracking and reporting search performance for components of a search query, in implementations according to the present disclosure.

DETAILED DESCRIPTION

Figure 1:
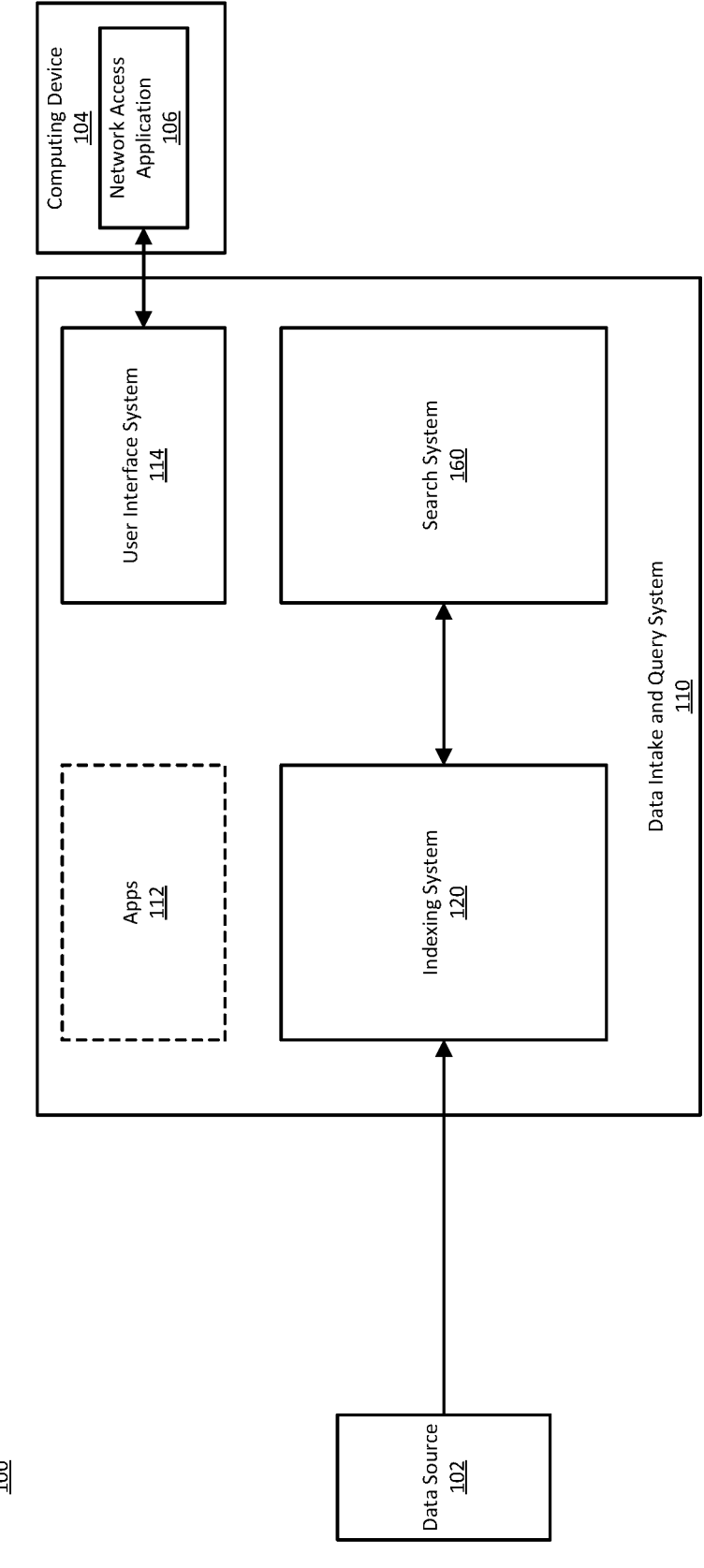
FIG. 1 is a block diagram illustrating an example computing environment that includes a data intake and query system.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 1 is a block diagram illustrating an example computing environment 100 that includes a data intake and query system 110. The data intake and query system 110 obtains data from a data source 102 in the computing environment 100, and ingests the data using an indexing system 120. A search system 160 of the data intake and query system 110 enables users to navigate the indexed data. Though drawn with separate boxes in FIG. 1, in some implementations the indexing system 120 and the search system 160 can have overlapping components. A computing device 104, running a network access application 106, can communicate with the data intake and query system 110 through a user interface system 114 of the data intake and query system 110. Using the computing device 104, a user can perform various operations with respect to the data intake and query system 110, such as administration of the data intake and query system 110, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 110 can further optionally include apps 112 that extend the search, analytics, and/or visualization capabilities of the data intake and query system 110.

The data intake and query system 110 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 110 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 110 can be executed on a single computing device, or execution of the program code can be distributed over multiple computing devices. For example, the program code can include instructions for both indexing and search components (which may be part of the indexing system 120 and/or the search system 160, respectively), which can be executed on a computing device that also provides the data source 102. As another example, the program code can be executed on one computing device, where execution of the program code provides both indexing and search components, while another copy of the program code executes on a second computing device that provides the data source 102. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 102 of the computing environment 100 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 102 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 120 obtains machine data from the data source 102 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 120 does not require prior knowledge of the structure of incoming data (e.g., the indexing system 120 does not need to be provided with a schema describing the data). Additionally, the indexing system 120 retains a copy of the data as it was received by the indexing system 120 such that the original data is always available for searching (e.g., no data is discarded, though, in some examples, the indexing system 120 can be configured to do so).

The search system 160 searches the data stored by the indexing 120 system. As discussed in greater detail below, the search system 160 enables users associated with the computing environment 100 (and possibly also other users) to navigate the data, generate reports, and visualize search results in "dashboards" output using a graphical interface. Using the facilities of the search system 160, users can obtain insights about the data, such as retrieving events from an index, calculating metrics, searching for specific conditions within a rolling time window, identifying patterns in the data, and predicting future trends, among other examples. To achieve greater efficiency, the search system 160 can apply map-reduce methods to parallelize searching of large volumes of data. Additionally, because the original data is available, the search system 160 can apply a schema to the data at search time. This allows different structures to be applied to the same data, or for the structure to be modified if or when the content of the data changes. Application of a schema at search time may be referred to herein as a late-binding schema technique.

The user interface system 114 provides mechanisms through which users associated with the computing environment 100 (and possibly others) can interact with the data intake and query system 110. These interactions can include configuration, administration, and management of the indexing system 120, initiation and/or scheduling of queries that are to be processed by the search system 160, receipt or reporting of search results, and/or visualization of search results. The user interface system 114 can include, for example, facilities to provide a command line interface or a web-based interface.

Users can access the user interface system 114 using a computing device 104 that communicates with data intake and query system 110, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 100. For example, a person can log in as a particular user and, using the user's digital information, can access the data intake and query system 110. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 104 can provide a human-machine interface through which a person can have a digital presence in the computing environment 100 in the form of a user. The computing device 104 is an electronic device having one or more processors and a memory capable of storing instructions for execution by the one or more processors. The computing device 104 can further include input/output (I/O) hardware and a network interface. Applications executed by the computing device 104 can include a network access application 106, such as a web browser, which can use a network interface of the client computing device 104 to communicate, over a network, with the user interface system 114 of the data intake and query system 110. The user interface system 114 can use the network access application 106 to generate user interfaces that enable a user to interact with the data intake and query system 110. A web browser is one example of a network access application. A shell tool can also be used as a network access application. In some examples, the data intake and query system 110 is an application executing on the computing device 106. In such examples, the network access application 106 can access the user interface system 114 without going over a network.

The data intake and query system 110 can optionally include apps 112. An app of the data intake and query system 110 is a collection of configurations, knowledge objects (a user-defined entity that enriches the data in the data intake and query system 110), views, and dashboards that may provide additional functionality, different techniques for searching the data, and/or additional insights into the data. The data intake and query system 110 can execute multiple applications simultaneously. Example applications include an information technology service intelligence application, which can monitor and analyze the performance and behavior of the computing environment 100, and an enterprise security application, which can include content and searches to assist security analysts in diagnosing and acting on anomalous or malicious behavior in the computing environment 100.

Though FIG. 1 illustrates only one data source, in practical implementations, the computing environment 100 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 100, the data intake and query system 110 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 100 can include on-prem and cloud-based computing resources, or only cloud-based resources. For example, an entity may have on-prem computing devices and a private cloud. In this example, the entity operates the data intake and query system 110 and can choose to execute the data intake and query system 110 on an on-prem computing device or in the cloud. In another example, a provider entity operates the data intake and query system 110 in a public cloud and provides the functionality of the data intake and query system 110 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 110. In some implementations, the entity providing the data intake and query system 110 is itself subscribing to the cloud services of a cloud service provider. As an example, a first entity provides computing resources under a public cloud service model, a second entity subscribes to the cloud services of the first provider entity and uses the cloud computing resources to operate the data intake and query system 110, and a third entity can subscribe to the services of the second provider entity in order to use the functionality of the data intake and query system 110. In this example, the data sources are associated with the third entity, users accessing the data intake and query system 110 are associated with the third entity, and the analytics and insights provided by the data intake and query system 110 are for purposes of the third entity's operations.

Figure 2:
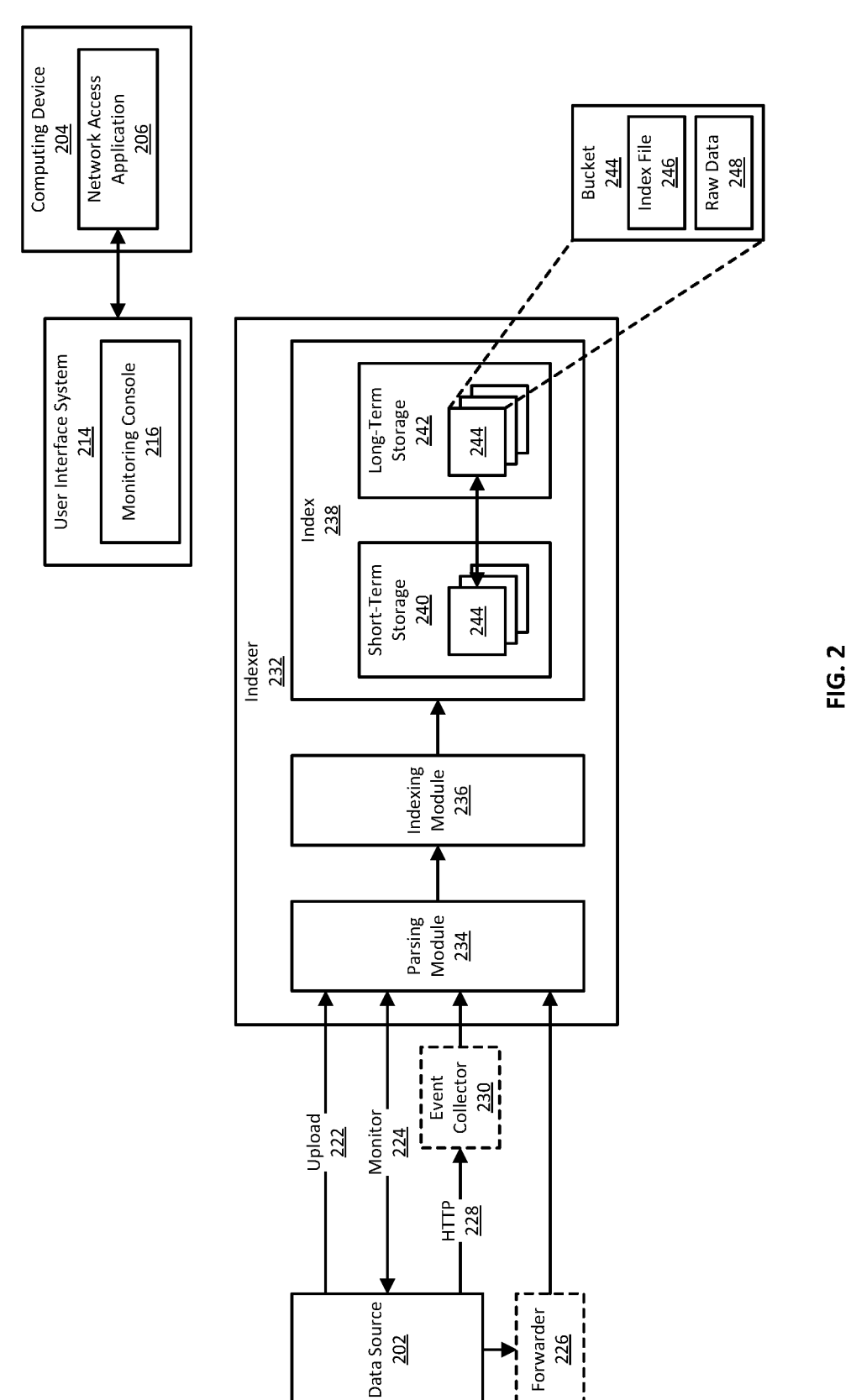
FIG. 2 is a block diagram illustrating in greater detail an example of an indexing system of a data intake and query system, such as the data intake and query system of FIG. 1.

FIG. 2 is a block diagram illustrating in greater detail an example of an indexing system 220 of a data intake and query system, such as the data intake and query system 110 of FIG. 1. The indexing system 220 of FIG. 2 uses various methods to obtain machine data from a data source 202 and stores the data in an index 238 of an indexer 232. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 220 enables the data intake and query system to obtain the machine data produced by the data source 202 and to store the data for searching and retrieval.

Users can administer the operations of the indexing system 220 using a computing device 204 that can access the indexing system 220 through a user interface system 214 of the data intake and query system. For example, the computing device 204 can be executing a network access application 206, such as a web browser or a terminal, through which a user can access a monitoring console 216 provided by the user interface system 214. The monitoring console 216 can enable operations such as: identifying the data source 202 for data ingestion; configuring the indexer 232 to index the data from the data source 232; configuring a data ingestion method; configuring, deploying, and managing clusters of indexers; and viewing the topology and performance of a deployment of the data intake and query system, among other operations. The operations performed by the indexing system 220 may be referred to as "index time" operations, which are distinct from "search time" operations that are discussed further below.

The indexer 232, which may be referred to herein as a data indexing component, coordinates and performs most of the index time operations. The indexer 232 can be implemented using program code that can be executed on a computing device. The program code for the indexer 232 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 232. In some implementations, the indexer 232 executes on the computing device 204 through which a user can access the indexing system 220. In some implementations, the indexer 232 executes on a different computing device than the illustrated computing device 204.

The indexer 232 may be executing on the computing device that also provides the data source 202 or may be executing on a different computing device. In implementations wherein the indexer 232 is on the same computing device as the data source 202, the data produced by the data source 202 may be referred to as "local data." In other implementations the data source 202 is a component of a first computing device and the indexer 232 executes on a second computing device that is different from the first computing device. In these implementations, the data produced by the data source 202 may be referred to as "remote data." In some implementations, the first computing device is "on-prem" and in some implementations the first computing device is "in the cloud." In some implementations, the indexer 232 executes on a computing device in the cloud and the operations of the indexer 232 are provided as a service to entities that subscribe to the services provided by the data intake and query system.

For a given data produced by the data source 202, the indexing system 220 can be configured to use one of several methods to ingest the data into the indexer 232. These methods include upload 222, monitor 224, using a forwarder 226, or using HyperText Transfer Protocol (HTTP 228) and an event collector 230. These and other methods for data ingestion may be referred to as "getting data in" (GDI) methods.

Using the upload 222 method, a user can specify a file for uploading into the indexer 232. For example, the monitoring console 216 can include commands or an interface through which the user can specify where the file is located (e.g., on which computing device and/or in which directory of a file system) and the name of the file. The file may be located at the data source 202 or maybe on the computing device where the indexer 232 is executing. Once uploading is initiated, the indexer 232 processes the file, as discussed further below. Uploading is a manual process and occurs when instigated by a user. For automated data ingestion, the other ingestion methods are used.

The monitor 224 method enables the indexing system 202 to monitor the data source 202 and continuously or periodically obtain data produced by the data source 202 for ingestion by the indexer 232. For example, using the monitoring console 216, a user can specify a file or directory for monitoring. In this example, the indexing system 202 can execute a monitoring process that detects whenever the file or directory is modified and causes the file or directory contents to be sent to the indexer 232. As another example, a user can specify a network port for monitoring. In this example, a monitoring process can capture data received at or transmitting from the network port and cause the data to be sent to the indexer 232. In various examples, monitoring can also be configured for data sources such as operating system event logs, performance data generated by an operating system, operating system registries, operating system directory services, and other data sources.

Monitoring is available when the data source 202 is local to the indexer 232 (e.g., the data source 202 is on the computing device where the indexer 232 is executing). Other data ingestion methods, including forwarding and the event collector 230, can be used for either local or remote data sources.

A forwarder 226, which may be referred to herein as a data forwarding component, is a software process that sends data from the data source 202 to the indexer 232. The forwarder 226 can be implemented using program code that can be executed on the computer device that provides the data source 202. A user launches the program code for the forwarder 226 on the computing device that provides the data source 202. The user can further configure the forwarder 226, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 226 can provide various capabilities. For example, the forwarder 226 can send the data unprocessed or can perform minimal processing on the data before sending the data to the indexer 232. Minimal processing can include, for example, adding metadata tags to the data to identify a source, source type, and/or host, among other information, dividing the data into blocks, and/or applying a timestamp to the data. In some implementations, the forwarder 226 can break the data into individual events (event generation is discussed further below) and send the events to a receiver. Other operations that the forwarder 226 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 230 provides an alternate method for obtaining data from the data source 202. The event collector 230 enables data and application events to be sent to the indexer 232 using HTTP 228. The event collector 230 can be implemented using program code that can be executed on a computing device. The program code may be a component of the data intake and query system or can be a standalone component that can be executed independently of the data intake and query system and operates in cooperation with the data intake and query system.

To use the event collector 230, a user can, for example using the monitoring console 216 or a similar interface provided by the user interface system 214, enable the event collector 230 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 202 as an alternative method to using a username and password for authentication.

To send data to the event collector 230, the data source 202 is supplied with a token and can then send HTTP 228 requests to the event collector 230. To send HTTP 228 requests, the data source 202 can be configured to use an HTTP client and/or to use logging libraries such as those supplied by Java, JavaScript, and .NET libraries. An HTTP client enables the data source 202 to send data to the event collector 230 by supplying the data, and a Uniform Resource Identifier (URI) for the event collector 230 to the HTTP client. The HTTP client then handles establishing a connection with the event collector 230, transmitting a request containing the data, closing the connection, and receiving an acknowledgment if the event collector 230 sends one. Logging libraries enable HTTP 228 requests to the event collector 230 to be generated directly by the data source. For example, an application can include or link a logging library, and through functionality provided by the logging library manage establishing a connection with the event collector 230, transmitting a request, and receiving an acknowledgement.

An HTTP 228 request to the event collector 230 can contain a token, a channel identifier, event metadata, and/or event data. The token authenticates the request with the event collector 230. The channel identifier, if available in the indexing system 220, enables the event collector 230 to segregate and maintain separate data from different data sources. The event metadata can include one or more key-value pairs that describe the data source 202 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 230 extracts events from HTTP 228 requests and sends the events to the indexer 232. The event collector 230 can further be configured to send events to one or more indexers. Extracting the events can include associating any metadata in a request with the event or events included in the request. In these implementations, event generation by the indexer 232 (discussed further below) is bypassed, and the indexer 232 moves the events directly to indexing. In some implementations, the event collector 230 extracts event data from a request and outputs the event data to the indexer 232, and the indexer generates events from the event data. In some implementations, the event collector 230 sends an acknowledgement message to the data source 202 to indicate that the event collector 230 has received a particular request form the data source 202, and/or to indicate to the data source 202 that events in the request have been added to an index.

The indexer 232 ingests incoming data and transforms the data into searchable knowledge in the form of events. In the data intake and query system, an event is a single piece of data that represents activity of the component represented in FIG. 2 by the data source 202. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 232 can include a parsing module 234 and an indexing module 236 for generating and storing the events. The parsing module 234 and indexing module 236 can be modular and pipelined, such that one component can be operating on a first set of data while the second component is simultaneously operating on a second sent of data. Additionally, the indexer 232 may at any time have multiple instances of the parsing module 234 and indexing module 236, with each set of instances configured to simultaneously operate on data from the same data source or from different data sources. The parsing module 234 and indexing module 236 are illustrated in FIG. 2 to facilitate discussion, with the understanding that implementations with other components are possible to achieve the same functionality.

The parsing module 234 determines information about incoming event data, where the information can be used to identify events within the event data. For example, the parsing module 234 can associate a source type with the event data. A source type identifies the data source 202 and describes a possible data structure of event data produced by the data source 202. For example, the source type can indicate which fields to expect in events generated at the data source 202 and the keys for the values in the fields, and possibly other information such as sizes of fields, an order of the fields, a field separator, and so on. The source type of the data source 202 can be specified when the data source 202 is configured as a source of event data. Alternatively, the parsing module 234 can determine the source type from the event data, for example from an event field in the event data or using machine learning techniques applied to the event data.

Other information that the parsing module 234 can determine include timestamps. In some cases, an event includes a timestamp as a field, and the timestamp indicates a point in time when the action represented by the event occurred or was recorded by the data source 202 as event data. In these cases, the parsing module 234 may be able to determine from the source type associated with the event data that the timestamps can be extracted from the events themselves. In some cases, an event does not include a timestamp and the parsing module 234 determines a timestamp for the event, for example from a name associated with the event data from the data source 202 (e.g., a file name when the event data is in the form of a file) or a time associated with the event data (e.g., a file modification time). As another example, when the parsing module 234 is not able to determine a timestamp from the event data, the parsing module 234 may use the time at which it is indexing the event data. As another example, the parsing module 234 can use a user-configured rule to determine the timestamps to associate with events.

The parsing module 234 can further determine event boundaries. In some cases, a single line (e.g., a sequence of characters ending with a line termination) in event data represents one event while in other cases, a single line represents multiple events. In yet other cases, one event may span multiple lines within the event data. The parsing module 234 may be able to determine event boundaries from the source type associated with the event data, for example from a data structure indicated by the source type. In some implementations, a user can configure rules the parsing module 234 can use to identify event boundaries.

The parsing module 234 can further extract data from events and possibly also perform transformations on the events. For example, the parsing module 234 can extract a set of fields (key-value pairs) for each event, such as a host or hostname, source or source name, and/or source type. The parsing module 234 may extract certain fields by default or based on a user configuration. Alternatively or additionally, the parsing module 234 may add fields to events, such as a source type or a user-configured field. As another example of a transformation, the parsing module 234 can anonymize fields in events to mask sensitive information, such as social security numbers or account numbers. Anonymizing fields can include changing or replacing values of specific fields. The parsing component 234 can further perform user-configured transformations.

The parsing module 234 outputs the results of processing incoming event data to the indexing module 236, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 232 can be configured to identify searchable segments that are parts of fields, searchable segments that are entire fields, or both. The parsing module 234 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 246, to find event data that matches a search query. In some implementations, segmentation can alternatively be performed by the forwarder 226. Segmentation can also be disabled, in which case the indexer 232 will not build a lexicon for the event data. When segmentation is disabled, the search system searches the event data directly.

Building index data structures generates the index 238. The index 238 is a storage data structure on a storage device (e.g., a disk drive or other physical device for storing digital data). The storage device may be a component of the computing device on which the indexer 232 is operating (referred to herein as local storage) or may be a component of a different computing device (referred to herein as remote storage) that the indexer 238 has access to over a network. The indexer 232 can manage more than one index and can manage indexes of different types. For example, the indexer 232 can manage event indexes, which impose minimal structure on stored data and can accommodate any type of data. As another example, the indexer 232 can manage metrics indexes, which use a highly structured format to handle the higher volume and lower latency demands associated with metrics data.

The indexing module 236 organizes files in the index 238 in directories referred to as buckets. The files in a bucket 244 can include raw data files, index files, and possibly also other metadata files. As used herein, "raw data" means data as when the data was produced by the data source 202, without alteration to the format or content. As noted previously, the parsing component 234 may add fields to event data and/or perform transformations on fields in the event data. Event data that has been altered in this way is referred to herein as enriched data. A raw data file 248 can include enriched data, in addition to or instead of raw data. The raw data file 248 may be compressed to reduce disk usage. An index file 246, which may also be referred to herein as a "time-series index" or tsidx file, contains metadata that the indexer 232 can use to search a corresponding raw data file 248. As noted above, the metadata in the index file 246 includes a lexicon of the event data, which associates each unique keyword in the event data with a reference to the location of event data within the raw data file 248. The keyword data in the index file 246 may also be referred to as an inverted index. In various implementations, the data intake and query system can use index files for other purposes, such as to store data summarizations that can be used to accelerate searches.

A bucket 244 includes event data for a particular range of time. The indexing module 236 arranges buckets in the index 238 according to the age of the buckets, such that buckets for more recent ranges of time are stored in short-term storage 240 and buckets for less recent ranges of time are stored in long-term storage 242. Short-term storage 240 may be faster to access while long-term storage 242 may be slower to access. Buckets may be moves from short-term storage 240 to long-term storage 242 according to a configurable data retention policy, which can indicate at what point in time a bucket is old enough to be moved.

A bucket's location in short-term storage 240 or long-term storage 242 can also be indicated by the bucket's status. As an example, a bucket's status can be "hot," "warm," "cold," "frozen," or "thawed." In this example, hot bucket is one to which the indexer 232 is writing data and the bucket becomes a warm bucket when the index 232 stops writing data to it. In this example, both hot and warm buckets reside in short-term storage 240. Continuing this example, when a warm bucket is moved to long-term storage 242, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 220 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 220 through the monitoring console 216 provided by the user interface system 214. Using the monitoring console 216, the user can configure and monitor an index cluster, and see information such as disk usage by an index, volume usage by an indexer, index and volume size over time, data age, statistics for bucket types, and bucket settings, among other information.

Figure 3:
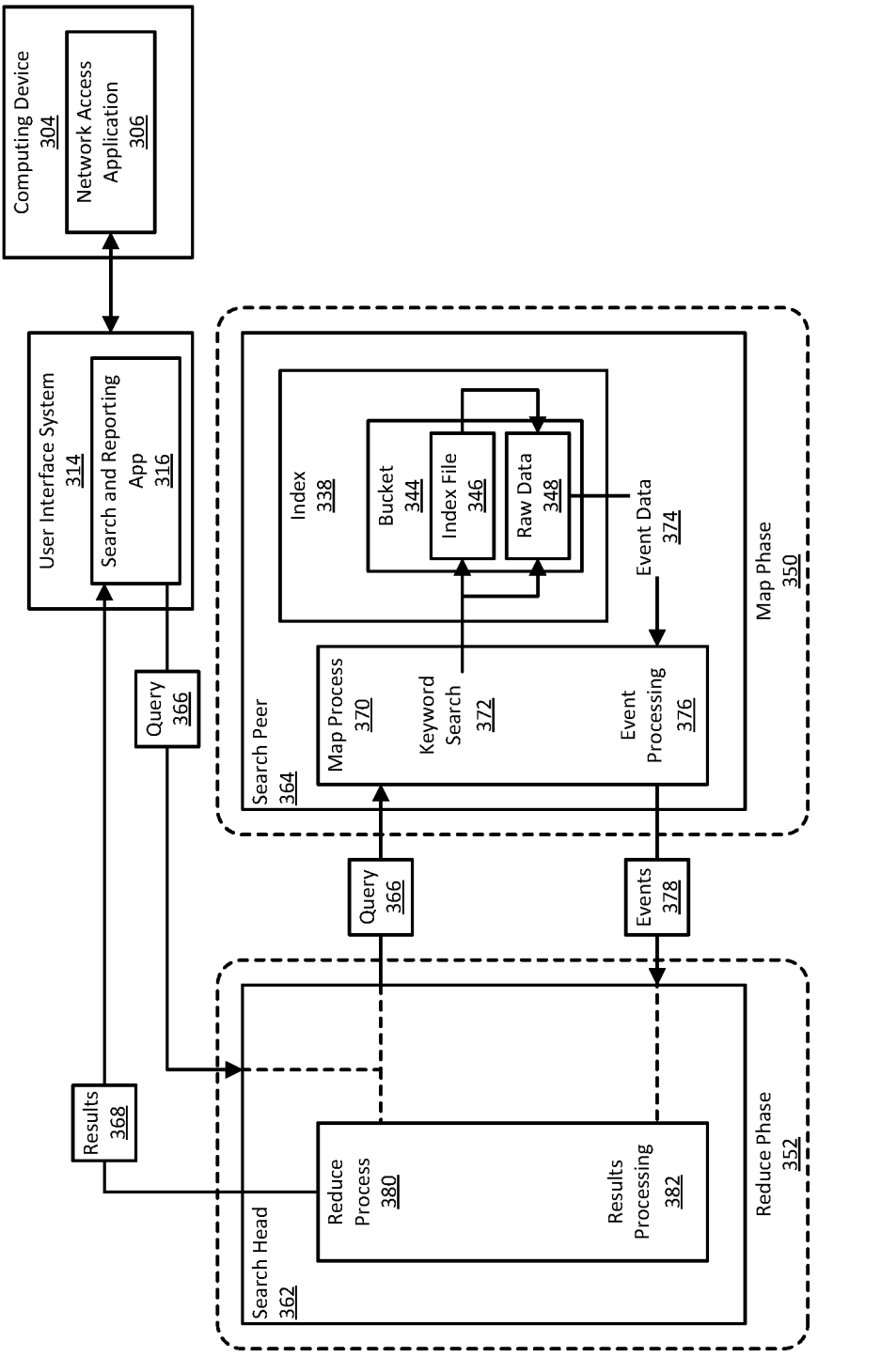
FIG. 3 is a block diagram illustrating in greater detail an example of the search system of a data intake and query system, such as the data intake and query system of FIG. 1.

FIG. 3 is a block diagram illustrating in greater detail an example of the search system 360 of a data intake and query system, such as the data intake and query system 110 of FIG. 1. The search system 360 of FIG. 3 issues a query 366 to a search head 362, which sends the query 366 to a search peer 364. Using a map process 370, the search peer 364 searches the appropriate index 338 for events identified by the query 366 and sends events 378 so identified back to the search head 362. Using a reduce process 382, the search head 362 processes the events 378 and produces results 368 to respond to the query 366. The results 368 can provide useful insights about the data stored in the index 338. These insights can aid in the administration of information technology systems, in security analysis of information technology systems, and/or in analysis of the development environment provided by information technology systems.

The query 366 that initiates a search is produced by a search and reporting app 316 that is available through the user interface system 314 of the data intake and query system. Using a network access application 306 executing on a computing device 304, a user can input the query 366 into a search field provided by the search and reporting app 316. Alternatively or additionally, the search and reporting app 316 can include pre-configured queries or stored queries that can be activated by the user. In some cases, the search and reporting app 316 initiates the query 366 when the user enters the query 366. In these cases, the query 366 maybe referred to as an "ad-hoc" query. In some cases, the search and reporting app 316 initiates the query 366 based on a schedule. For example, the search and reporting app 316 can be configured to execute the query 366 once per hour, once per day, at a specific time, on a specific date, or at some other time that can be specified by a date, time, and/or frequency. These types of queries maybe referred to as scheduled queries.

The query 366 is specified using a search processing language. The search processing language includes commands or search terms that the search peer 364 will use to identify events to return in the search results 368. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 366 to include sequential commands, where a subsequent command may operate on the results of a prior command. As an example, sequential commands may be separated in the query 366 by a vertical line ("|" or "pipe") symbol.

In addition to one or more search commands, the query 366 includes a time indicator. The time indicator limits searching to events that have timestamps described by the time indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 366 occurs in two broad phases: a map phase 350 and a reduce phase 352. The map phase 350 takes place across one or more search peers. In the map phase 350, the search peers locate event data that matches the search terms in the search query 366 and sorts the event data into field-value pairs. When the map phase 350 is complete, the search peers send events that they have found to one or more search heads for the reduce phase 352. During the reduce phase 352, the search heads process the events through commands in the search query 366 and aggregate the events to produce the final search results 368.

A search head, such as the search head 362 illustrated in FIG. 3, is a component of the search system 360 that manages searches. The search head 362, which may also be referred to herein as a search management component, can be implemented using program code that can be executed on a computing device. The program code for the search head 362 can be stored on a non-transitory computer-readable medium and from this medium can be loaded or copied to the memory of a computing device. One or more hardware processors of the computing device can read the program code from the memory and execute the program code in order to implement the operations of the search head 362.

Upon receiving the search query 366, the search head 362 directs the query 366 to one or more search peers, such as the search peer 364 illustrated in FIG. 3. "Search peer" is an alternate name for "indexer" and a search peer may be largely similar to the indexer described previously. The search peer 364 may be referred to as a "peer node" when the search peer 364 is part of an indexer cluster. The search peer 364, which may also be referred to as a search execution component, can be implemented using program code that can be executed on a computing device. In some implementations, one set of program code implements both the search head 362 and the search peer 364 such that the search head 362 and the search peer 364 form one component. In some implementations, the search head 362 is an independent piece of code that performs searching and no indexing functionality. In these implementations, the search head 362 may be referred to as a dedicated search head.

The search head 362 may consider multiple criteria when determining whether to send the query 366 to the particular search peer 364. For example, the search system 360 may be configured to include multiple search peers that each have duplicative copies of at least some of the event data and are implanted using different hardware resources. In this example, the sending the search query 366 to more than one search peer allows the search system 360 to distribute the search workload across different hardware resources. As another example, search system 360 may include different search peers for different purposes (e.g., one has an index storing a first type of data or from a first data source while a second has an index storing a second type of data or from a second data source). In this example, the search query 366 may specify which indexes to search, and the search head 362 will send the query 366 to the search peers that have those indexes.

To identify events 378 to send back to the search head 362, the search peer 364 performs a map process 370 to obtain event data 374 from the index 338 that is maintained by the search peer 364. During a first phase of the map process 370, the search peer 364 identifies buckets that have events that are described by the time indicator in the search query 366. As noted above, a bucket contains events whose timestamps fall within a particular range of time. For each bucket 344 whose events can be described by the time indicator, during a second phase of the map process 370, the search peer 364 performs a keyword search 374 using search terms specified in the search query 366. The search terms can be one or more of keywords, phrases, fields, Boolean expressions, and/or comparison expressions that in combination describe events being searched for. When segmentation is enabled at index time, the search peer 364 performs the keyword search 372 on the bucket's index file 346. As noted previously, the index file 346 includes a lexicon of the searchable terms in the events stored in the bucket's raw data 348 file. The keyword search 372 searches the lexicon for searchable terms that correspond to one or more of the search terms in the query 366. As also noted above, the lexicon incudes, for each searchable term, a reference to each location in the raw data 348 file where the searchable term can be found. Thus, when the keyword search identifies a searchable term in the index file 346 that matches a search term in the query 366, the search peer 364 can use the location references to extract from the raw data 348 file the event data 374 for each event that include the searchable term.

In cases where segmentation was disabled at index time, the search peer 364 performs the keyword search 372 directly on the raw data 348 file. To search the raw data 348, the search peer 364 may identify searchable segments in events in a similar manner as when the data was indexed. Thus, depending on how the search peer 364 is configured, the search peer 364 may look at event fields and/or parts of event fields to determine whether an event matches the query 366. Any matching events can be added to the event data 374 read from the raw data 348 file. The search peer 364 can further be configured to enable segmentation at search time, so that searching of the index 338 causes the search peer 364 to build a lexicon in the index file 346.

The event data 374 obtained from the raw data 348 file includes the full text of each event found by the keyword search 372. During a third phase of the map process 370, the search peer 364 performs event processing 376 on the event data 374, with the steps performed being determined by the configuration of the search peer 364 and/or commands in the search query 366. For example, the search peer 364 can be configured to perform field discovery and field extraction. Field discovery is a process by which the search peer 364 identifies and extracts key-value pairs from the events in the event data 374. The search peer 364 can, for example, be configured to automatically extract the first 100 fields (or another number of fields) in the event data 374 that can be identified as key-value pairs. As another example, the search peer 364 can extract any fields explicitly mentioned in the search query 366. The search peer 364 can, alternatively or additionally, be configured with particular field extractions to perform.

Other examples of steps that can be performed during event processing 376 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 364 sends processed events 378 to the search head 362, which performs a reduce process 380. The reduce process 380 potentially receives events from multiple search peers and performs various results processing 382 steps on the received events. The results processing 382 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 382 can further include applying commands from the search query 366 to the events. The query 366 can include, for example, commands for evaluating and/or manipulating fields (e.g., to generate new fields from existing fields or parse fields that have more than one value). As another example, the query 366 can include commands for calculating statistics over the events, such as counts of the occurrences of fields, or sums, averages, ranges, and so on, of field values. As another example, the query 366 can include commands for generating statistical values for purposes of generating charts of graphs of the events.

The reduce process 380 outputs the events found by the search query 366, as well as information about the events. The search head 362 transmits the events and the information about the events as search results 368, which are received by the search and reporting app 316. The search and reporting app 316 can generate visual interfaces for viewing the search results 368. The search and reporting app 316 can, for example, output visual interfaces for the network access application 306 running on a computing device 304 to generate.

The visual interfaces can include various visualizations of the search results 368, such as tables, line or area charts, Choropleth maps, or single values. The search and reporting app 316 can organize the visualizations into a dashboard, where the dashboard includes a panel for each visualization. A dashboard can thus include, for example, a panel listing the raw event data for the events in the search results 368, a panel listing fields extracted at index time and/or found through field discovery along with statistics for those fields, and/or a timeline chart indicating how many events occurred at specific points in time (as indicated by the timestamps associated with each event). In various implementations, the search and reporting app 316 can provide one or more default dashboards. Alternatively or additionally, the search and reporting app 316 can include functionality that enables a user to configure custom dashboards.

The search and reporting app 316 can also enable further investigation into the events in the search results 316. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 366. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Search Performance Monitoring

One of the technical challenges with searching data is characterizing and measuring search performance. Characterizing search performance has historically been a difficult task due to the multitude of factors that can affect search execution including the different sources of noise that can influence search performance and detrimentally affect the customer experience. To measure search performance, query systems for IT environments observe the overall time taken for the search and in particular, the time between when a search is dispatched (which in some cases may include the time it takes to type a search into the user interface) and when a search result is delivered (which in some cases may include the time it takes to display the search results in the user interface).

The search runtime of a given search, however, is highly variable and serves as an unreliable metric because the search runtime is a function of many factors, including, among others, search concurrency, number of saved searches configured, search time range, search schedule and frequency, number of indexes searched, volume of events in each index searched, size and number of lookup tables, number and types of commands in the search language, presence and complexity of custom search commands, type of hardware including number of CPU cores, etc. Search runtime is, therefore, a noisy metric on which to base measurement of search performance. Simply analyzing the last N runtimes is too high cardinality of a metric to provide any meaningful result and cannot be used efficiently for purposes of monitoring. Further, generalized query systems are simply unable to isolate a degradation in search runtime to one or more of the several factors that can influence the overall search runtime.

Another challenge in measuring search performance is that tracking search performance is often subject to arbitrary customer expectations and claims without an established baseline for what constitutes adequate performance. Generalized query systems do not present information to clients (e.g., customers with a subscription to the query system) in a fashion that makes it easy for the clients to investigate search performance. In addition, generalized query systems do not contain any tools for the provider of the query system to efficiently determine which of the clients are experiencing the most severe degradation of search performance. Accordingly, such query systems do not easily allow the provider of the query system to effectively triage between the tenants. Additionally, these query systems are unable to track a historical measure of how the query system is performing.

Implementations of a search system of a data intake and query system (such as the data intake and query system 110 discussed in connection with FIG. 3) address these challenges by monitoring searches both at the search level and at a component level. Search performance, at the search level, is monitored by identifying and tracking a metric that is timely and reliable enough so that performance issues can be efficiently captured before a customer or tenant (e.g., a subscriber entity of the data intake and query system 110 as discussed above in connection with FIG. 1) notices a degradation in performance. This allows the provider entity (e.g., the entity operating the data intake and query system and providing the functionality of the data intake and query system 110 as a service in the cloud that the subscriber entity pays for) sufficient time to plan a remedial response.

In some implementations, a search runtime variance is tracked for each search to which the provider entity provides the data intake and query system functionality as a service. In some implementations of the search system, a search runtime variance is computed for each distinct search based on prior execution runtimes for the same search. Once a runtime variance has been computed for a given search, current instances of the search can be compared to the runtime variance to determine whether the runtime for the current instance of the search exceeds the variance or exceeds a tolerable range of values determined based on the variance. It should be noted that implementations of the present disclosure are not limited to search runtime variance computations and any other feasible statistical measure can also be used.

In some implementations, a single composite metric can also be tracked for the entire population of searches executed by a tenant. To compute the composite metric for an entire population of searches, one or more searches scheduled by a tenant is monitored during a given window of time. For each distinguishable or distinct scheduled search, there can be multiple instances of that search that execute during the given time window. The performance for each distinct search during the given time window is first tracked separately using a statistical measure (e.g., by computing a variance for multiple instances of each distinct or unique search). Once the statistical measure has been computed for each distinct search using the runtimes of multiple instances of the respective search scheduled in the given time window, a composite metric is computed for the entire population of searches executed by the tenant by collapsing the computed statistical measure for the various searches into a single metric (e.g., a composite variance may be computed for the entire set of searches that executed in the given time window). The composite metric conveys how searches associated with a particular tenant are performing during the given time window and establishes a baseline for future searches. After computing the composite metric, the runtime for each incoming instance of a search executed by the tenant can be compared to the composite variance to determine if there is a violation. This violation can be reported to a provider of a data intake and query system 110. Alternatively, a count of the number of violations can be maintained and reported periodically to a provider of the data intake and query system.

Using the composite metric associated with each tenant, the performance of several different tenants being serviced by the provider of the data intake and query system 110 can also be compared. For example, violations associated with each tenant can be aggregated and compared to the violations reported by other tenants. In this manner, the problems associated with higher priority tenants or tenants experiencing a higher number of performance degradations can be triaged by the provider.

In addition to monitoring searches at the search level, implementations of the search system 160 of a data intake and query system 110 also address the challenge of isolating a degradation in search runtime to one or more of the several factors by monitoring searches at a more granular level. A scheduled search can be associated with a complex and customized query that is comprised of one or more components (e.g., search commands in the query). Implementations of the search system allow search performance to be tracked at the level of the search component. Implementations of the search system 160 are able to measure and flag search performance at a component level and identify any component within a search that is degraded or responsible for the degraded performance of the search. In order to track the components of a search, a unique identifier is associated with each component of the search. This unique identifier is used to correlate the performance of the same component across various executions of the component (either for the same tenant or multiple tenants of a data intake and query system 110).

When the search is executed, metrics associated with components of the search are computed and correlated with historical metrics from prior executions of the same search using the unique identifiers. A determination is made if the metrics (e.g., search runtimes) of an incoming search are within an expected range or whether they fall outside the range based on the statistical computation (e.g. variance, mean, etc.) that is being tracked using the prior set of executions of the same search. The results of this comparison are transmitted from a deployment of a data intake and query system associated with a tenant (e.g., on the premises deployment, cloud deployment, or a hybrid) to a monitoring tool in the cloud controlled by a provider entity of the data intake and query system 110. The monitoring tool can, therefore, easily track if the particular search component for which the metric is computed is experiencing problems.

In some implementations, the monitoring tool monitors the health and performance of multiple tenants or subscriber entities in the cloud computing environment. For example, the monitoring tool can track a count for the number of times a metric associated with a particular search component spikes above a threshold during a given time window or for a given number of executions of the same search. In some implementations, the threshold is based on, for example, a historical variance, mean or other statistical measure computed for the respective metric. In this way, the monitoring tool can keep track of failing search components for a number of tenants without consuming too many computing resources. In some implementations, the monitoring tool can track aggregate number of violations (or spikes) for all the search components associated with each tenant to determine which customer is experiencing the highest number of failing components.

At least one advantage of the disclosed techniques is that tracking search performance at the search level allows a single metric (e.g., search runtime variance) to be tracked for a search to determine if there is degradation in search performance for that search. Another advantage of tracking search performance at the search level is that a metric such as a search runtime variance can be easily tracked and computed without imposing too high of a computational load. Further, a statistical measure such a variance determined using a sufficient number of historical values establishes a reliable baseline for comparing search runtimes, which is otherwise a noisy metric.

Additionally, tracking search performance at the search level allows a single composite metric for a search population associated with each tenant to be tracked to determine if there is degradation in search performance. Using a single composite metric to establish a baseline for search performance is efficient and conserves computational resources. When incoming searches exceed the baseline or range of tolerance established by the composite metric, individual alerts or aggregate number of alerts can be transmitted from the tenant to the provider entity. Processing alerts is not computationally intensive and, therefore, the resources of the provider entity are freed up to service several different tenants because it does not need to dedicate significant resources to executing search queries, tracking statistics associated with the queries or comparing performance levels for the queries. It also allows the provider entity to efficiently identify which of the tenants are experiencing a heavy degradation in search performance and effectively triage between the tenants to ensure that degradations at the higher priority tenants are addressed first. Further, tracking a single composite metric for each tenant allows search performance information (e.g., search runtime variance) regarding several to all the tenants to be displayed simultaneously through a graphical user interface ("GUI"), thereby, allowing the provider entity to easily track how the various tenants are performing.

Another advantage of the disclosed techniques is that tracking search performance at the component level provides more meaningful results especially in circumstances where tenants are entering complex queries with different options to customize the query to suit their particular needs. Focusing on the performance metrics at the search component level allows the provider entity more precise insight into the root cause of the search degradation. Further, tracking a composite metric for each of the components of a search allows the provider entity to be notified when a runtime associated with a particular search component crosses a threshold determined based on the composite metric. Since receiving alerts or counts of alerts from a number of tenants is not a computationally intensive task, the provider entity's resources are freed up to service a number of tenants in parallel without consuming too many computing resources. Additionally, aggregating the number of violations for all the search components associated with each tenant to identify which customer is experiencing the highest number of failing components allows the provider entity to prioritize customer support between the customers. For these reasons, the disclosed techniques represent a technological advancement compared to typical approaches of querying data systems and tracking search performance results.

Figure 4:
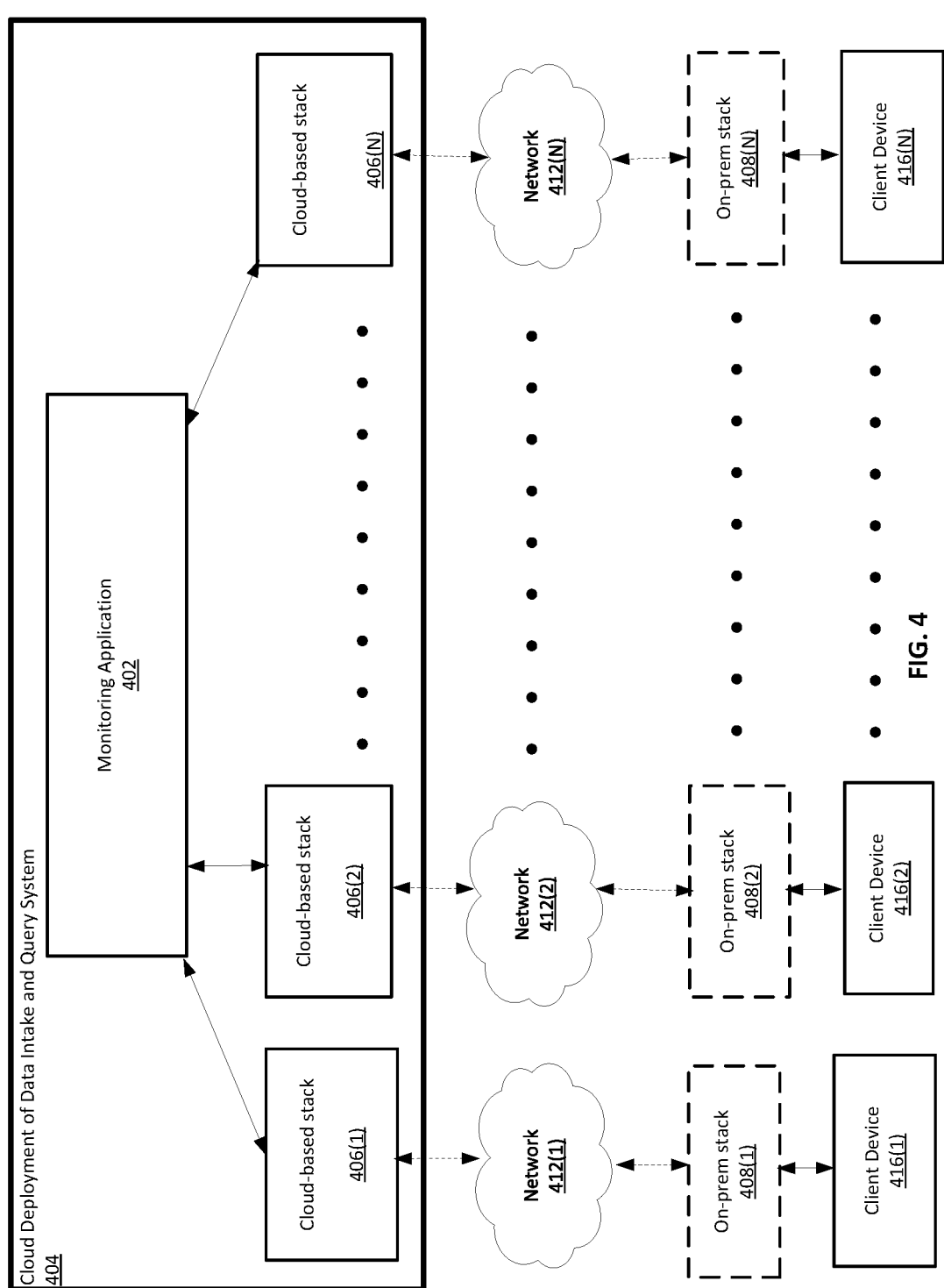
FIG. 4 illustrates a network architecture that enables tracking search performance for multiple subscribers of a cloud-based data intake and query system, in implementations according to the present disclosure.

FIG. 4 illustrates a network architecture that enables tracking search performance for multiple subscribers of a cloud-based data intake and query system, in implementations according to the present disclosure. The architecture 400 of FIG. 4 illustrates a cloud deployment of a data intake and query system 404 ("cloud deployment") that is operated by a provider entity operating cloud-based network resources. The cloud deployment 404 may be a distributed implementation of the data intake and query system (e.g., a distributed implementation of the data intake and query system 110).

As explained above in connection with FIG. 1, a provider entity can operate a data intake and query system in the cloud (e.g., cloud deployment of data intake and query system 404) and provides the functionality of the data intake and query system as a service, for example, under a Software-as-a-Service (SaaS) model, to entities that pay for the use of the service on a subscription basis. These entities can, for example, be subscribers or customers who subscribe to the cloud deployment 404. As shown in FIG. 4, each tenant can be associated with a respective cloud deployment of a customer stack 406 (referred to herein as a "cloud-based stack") (e.g., 4016(1) . . . 406(N)). For explanatory purposes, multiple instances of like objects are denoted with reference numbers identifying the object and parenthetical numbers identifying the instance, where needed.

In some implementations, the provider entity provisions a separate tenant (or possibly multiple tenants) in the cloud network for each subscriber entity or customer, where each tenant associated with a subscriber entity executes a separate and distinct instance of a data intake and query system. For example, each cloud-based stack 406 in FIG. 4 executes a separate instance of data intake and query system 110 discussed in connection with FIG. 1. In other words, each cloud-based stack 406 is provisioned in the cloud deployment 404 and is a separate instantiation of a data intake and query system 110 (from FIG. 1) that is associated with a subscriber entity or customer. In some embodiments, each subscriber entity may be associated with one or more tenants.

A stack comprises a group of computing devices associated with a subscriber entity that implement a separate instance of the data intake and query system 110 and run independently from computing devices associated with other subscriber entities in the platform operated by the provider entity. A stack can either be a cloud-based stack (e.g., cloud-based stack 406), or an on-prem stack (e.g., on-prem stack 408), as will be discussed below. Each stack can comprise, at least, an indexing system, a search system and a user interface system as discussed in connection with FIG. 1. The indexers, search heads, and other computing devices needed for each stack can be implemented using program code that can be executed on the computing devices within the stack, as explained previously.

In some implementations, a provider entity that controls the cloud deployment 404 operates network resources (e.g., processor capacity, network capacity, storage capacity, etc.), located for example in a data center, that it makes available to subscriber entities. While the provider entity controls the computing devices comprised within each cloud-based stack (e.g. indexers, search heads, and other components associated with the data intake and query system discussed in connection with FIGS. 1-3), the provider entity can, for example, allow a subscriber entity to pay for a subscription that enables users associated with subscriber entity to access a certain amount of the provider entity's cloud resources, including the computing devices within the cloud-based stack for a limited time. The subscriber entity does not have physical control of the computing devices that are in the cloud, and has digital access to resources provided by the computing devices only to the extent that such access is enabled by the provider entity.

In some implementations, the architecture 400 includes an optional on-prem deployment of a customer stack 408 (e.g., 408(1) . . . 408(N)) ("on-prem stack") for each customer in addition to the cloud-based computing resources. As discussed above, in an "on the premises" or "on-prem" implementation, the computing devices may physically and digitally be controlled by one entity (e.g., the subscribing entity), meaning that the computing devices are in physical locations that are owned and/or operated by the entity and are within a network domain that is controlled by the entity. These computing devices comprise an on-prem stack. Each on-prem stack 408 comprises a separate instantiation of a data intake and query system 110.

In some implementations, the computing environment for each subscribing entity can comprise a hybrid deployment, which includes both on-prem and cloud-based computing resources. For example, a stack for a subscribing entity can comprise both an on-premises deployment (e.g., on-prem stack 408) and a cloud-based deployment (e.g., cloud-based stack 406).

In some implementations, each client device 416 (e.g., client devices 416(1) . . . 416(N)) can communicate with a respective stack 406 or 408 through a user interface system. The user interface system in each client device 416 may perform substantially the same functions as the user interface system 114 of the data intake and query system 110 discussed in connection with FIG. 1.

Secure communications between a client device 416 and a cloud-based stack 406 are enabled via network 412 (e.g., 412(1) . . . 412(N)), in accordance with example implementations. Further, secure communications between the optional on-prem stack 408 and the cloud-based stack 406 can also be enabled through network 412. In various implementations, the network 412(1) . . . 412(N) may be portions of the same network or may include one or more shared network components that communicate with each of the networks 412(1) . . . 412(N). In various implementations, the cloud deployment 404 can communicate with a network interface of a given client device 416 through use of a mobile gateway that facilitates communication between devices behind a firewall, or set of firewalls.

Using the client device 416, a user can perform various operations with respect to the cloud-based stack 406, such as administration of the data intake and query system instance comprised within the cloud-based stack 406, management and generation of "knowledge objects," (user-defined entities for enriching data, such as saved searches, event types, tags, field extractions, lookups, reports, alerts, data models, workflow actions, and fields), initiating of searches, and generation of reports, among other operations. In some implementations, the client device 416 can be executing a network access application, such as a web browser or a terminal, through which a user can access a monitoring console provided by the user interface system. The monitoring console performs substantially the same functions as monitoring console 216 discussed in connection with FIG. 2.

In some implementations, using the network access application installed on the client device 416, a subscriber entity or client can input a query into a search field in a GUI of the user interface system (e.g., user interface system 314 in FIG. 3). This GUI can be made available through an application installed on the client device 416 (e.g., search and reporting app 316 also discussed in connection with FIG. 3). Alternatively, or additionally, the search and reporting app can include pre-configured queries or stored queries that can be activated by the user. In some cases, the search and reporting app initiates the query when the user enters the query. In these cases, the query maybe referred to as an "ad-hoc" query. In some cases, the search and reporting app initiates the query based on a schedule. For example, the search and reporting app can be configured to execute the query once per hour, once per day, at a specific time, on a specific date, or at some other time that can be specified by a date, time, and/or frequency. These types of queries maybe referred to as "scheduled queries."

The cloud deployment 404 uses a monitoring application 402 to receive telemetry data from the various stacks. The monitoring application 402 tracks search performance statistics for various tenants based on metrics and other telemetry data reported to the monitoring application 402 from the cloud-based stacks 406(1) . . . 406(N) and, optionally, from the on-prem stacks 408(1) . . . 408(N). The monitoring application 402 is typically an application installed on one or more computing devices controlled by the provider entity that also controls the cloud deployment 404. It should be noted that the elements of the cloud deployment 404 may be distributed in the cloud and are not necessarily co-located. Accordingly, while monitoring application 402 can be controlled by the provider entity, the application can be installed on a computing device that is at a different location from a cloud-based stack 406, which can also be controlled by the provider entity. Furthermore, the monitoring application 402 may itself be distributed across a number of different computing devices.

Implementations of the search system disclosed herein address the challenges of generalized search systems by monitoring searches at a search level, a component level and at a stack level. As discussed earlier, at the search level, a search runtime variance (or other statistical metric) can be tracked for each search or a composite variance metric can be tracked for an entire population of searches executed by a tenant.

Where a search runtime variance is tracked for each search separately, any incoming search can be compared to a variance computed for that search based on prior executions of that search. If the runtime for the incoming search exceeds a predetermined threshold or tolerance range that is based on the computed variance, an alert is generated. The alert can either be reported to the monitoring application 402 individually or counts of alerts can be maintained at the stack and reported periodically to the monitoring application 402.

In some implementations, a composite variance metric for an entire search population associated with a tenant can be tracked as noted above. The composite metric, in some implementations, is computed at the stack using computing devices associated with the stack. The composite metric conveys how searches associated with a particular stack are performing during the given time window. For example, the composite metric tracked by each cloud-based stack 406 (or, optionally, on-prem stack 408) can be used to determine whether runtimes for incoming (or current) searches are fall below a critical threshold or within an acceptable range based on a baseline established by the composite metric. Any violations (or counts of violations) associated with searches that are considered outside the acceptable range are communicated by each cloud-based stack 406 to the monitoring application 402, thereby, allowing the provider entity to efficiently identify which of the tenants are experiencing a heavy degradation in search performance and effectively triage between the tenants to ensure that degradations at the higher priority tenants are addressed first.

Further, implementations of the search system for the data intake and query system also monitor performance at the component level. In some implementations, as discussed earlier, alerts or violations associated with degrading components are reported to the monitoring application 502 as they occur and the monitoring application 502 maintains a count for the number of times a metric associated with a particular search component (for a search executed by a cloud-based stack 406 or an on-prem stack 408) spikes above a threshold during a given time window or for a given number of executions of the same search. In alternative implementations, the counts of violations for each search component are maintained at the stack level and reported to the monitoring application 502 periodically.

In some implementations, the monitoring application 502 can track performance at the stack level. The monitoring application 502 tracks performance at the stack level by aggregating the number of spikes (or violations) for the search components associated with each tenant. In other words, for each subscribing entity, all the violations reported by search components executed at a stack associated with the respective subscribing entity are aggregated. By summing the total number of violations associated with each tenant, the monitoring application 502 is able to determine which customer is experiencing the highest number of failing components. This allows the provider entity to triage between the various customers efficiently. It also allows the provider entity insight to prioritize high-value customers who may be experiencing more problems than is considered acceptable by the provider entity.

Figure 5:
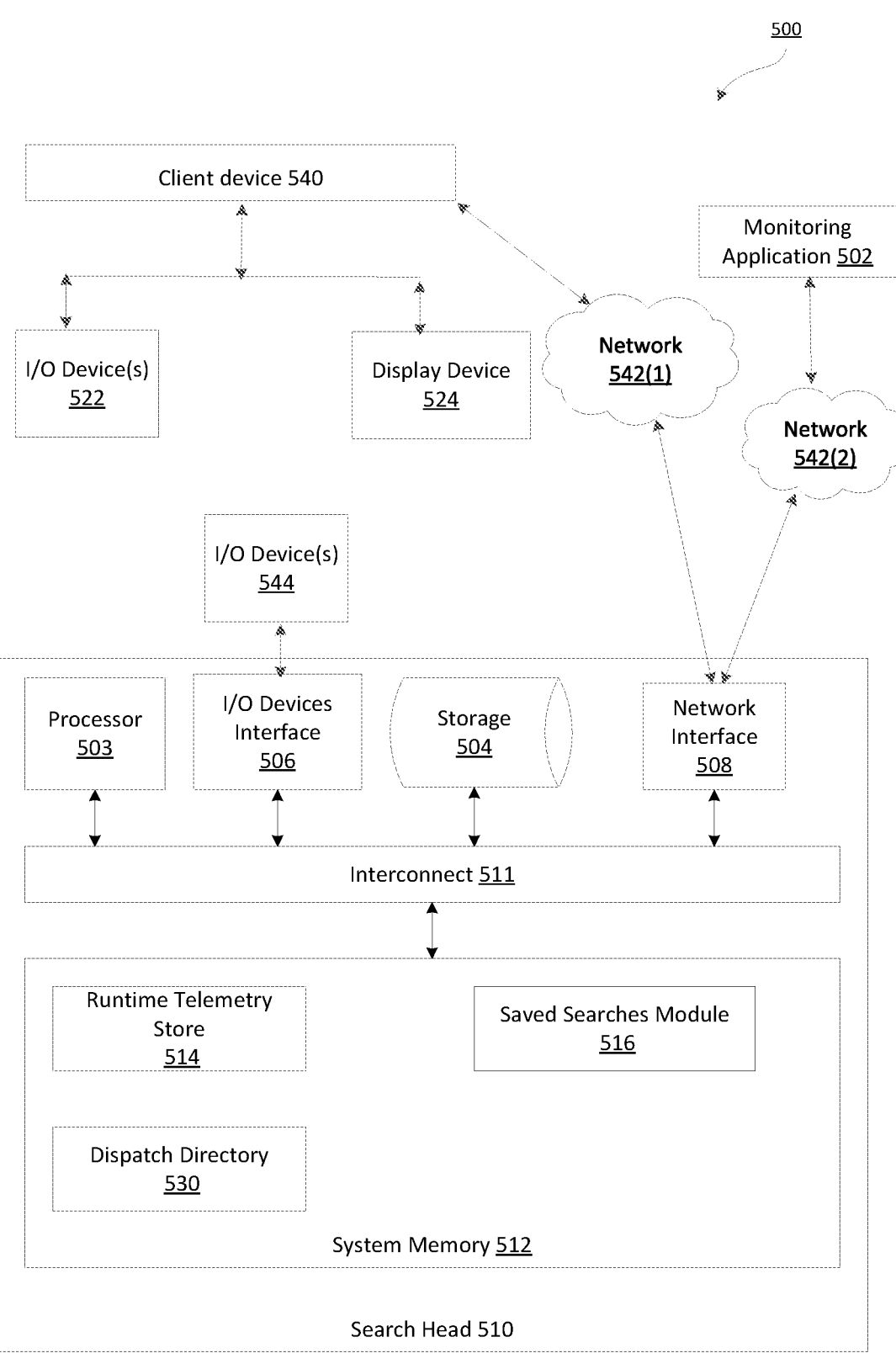
FIG. 5 illustrates a more detailed view of a data processing environment including a search head implemented within a customer stack, a client device, and a monitoring application in a cloud deployment in implementations according to the present disclosure.

FIG. 5 illustrates a more detailed view of a data processing environment including a search head implemented within a customer stack, a client device, and a monitoring application in a cloud deployment in implementations according to the present disclosure. As noted previously, each cloud-based stack 406 (or on-prem stack 408) can comprise, at least, an indexing system, a search system and a user interface system (as discussed in connection with FIG. 1). The indexers, search heads, and other computing devices associated with the indexing and search system for each stack can be implemented using program code that can be executed on the computing devices within the stack.

As shown in FIG. 5, the data processing environment 500 may include, without limitation, a search head 510 and a client device 540 communicating with one another over a network 542(1). The data processing environment 500 can also include the search head 510 and a monitoring application 502 communicating over a network 542(2). The client device functions substantially the same as the client device 416 described in FIG. 4, the search head 510 functions substantially the same as the search head 362 described in FIG. 3, and the monitoring application 502 functions substantially the same as the monitoring application 402 described in FIG. 4.

Examples of the client device 540 may include, without limitation, a mobile device (e.g., a smartphone, a tablet computer, a handheld computer, a wearable device, a portable media player, a virtual reality (VR) console, an augmented reality (AR) console, a laptop computer, a desktop computer, a server, a gaming device, a streaming device (e.g., an Apple TV® device, a Roku® device, etc.), and so forth. The client device 540 may include, among other components, a display device 524, and input/output (I/O) device(s) 522. Not shown in FIG. 4 but also included in the client device 540 can be, without limitation, a network interface, an interconnect, and system memory, a processor, and storage.

The I/O devices can include, without limitation, sensors (e.g., one or more cameras, location sensor(s), etc.) and input device(s) (e.g., a keyboard, stylus, microphone, etc.). The display device 524 generally represents any technically-feasible means for generating an image for display. For example, the display device 524 could be a liquid crystal display (LCD) display, an organic light-emitting diode (OLED) display, or a digital light processing (DLP) display. In some implementations, the subscriber entity or client can input a query into a search field in a GUI made available through an application installed on the client device 540, as discussed above. The query is received and processed by a search head 510, which is part of the search system of a stack associated with the subscribing entity. As will be discussed in detail below, the search head tracks metrics for searches received from the subscriber entity and reports results to the monitoring application 502.

The search head 510 (which performs substantially the same function as the search head 362 illustrated in FIG. 3), is a component of the search system (e.g., search system 360 in FIG. 3) that manages searches. As discussed above, the search head 510 can be implemented using program code that can be executed on a computing device. The program code for the search head 510 can be stored on a non-transitory computer-readable medium and from this medium can be loaded or copied to the memory of a computing device. One or more hardware processors of the computing device can read the program code from the memory and execute the program code in order to implement the operations of the search head 510.

The search head 510 may include, without limitation, a processor 503, storage 504, an input/output (I/O) device interface 506, I/O devices 544, a network interface 508, an interconnect 511, and system memory 512.

In general, the processor 503 may retrieve and execute programming instructions stored in the system memory 512. The processor 503 may be any technically-feasible form of processing device configured to process data and execute program code. The processor 503 could be, for example, a central processing unit (CPU), a graphics processing unit (GPU), an application-specific integrated circuit (ASIC), a field-programmable gate array (FPGA), and so forth. The processor 503 stores and retrieves application data residing in the system memory 512. The processor 503 is included to be representative of a single CPU, multiple CPUs, a single CPU having multiple processing cores, and the like. In operation, the processor 503 is the manager processor of the search head 510, controlling and coordinating operations of other system components.

The system memory 512 stores software application programs and data for use by the processor 503. For example, the system memory 512 includes the runtime telemetry store 514, a dispatch directory 530 and saved searches module 516. The processor 503 executes software application programs stored within the system memory 512 and, optionally, an operating system. In particular, the processor 503 executes software and then performs one or more of the functions and operations set forth in the present application.

In some implementations the runtime telemetry store 514 stores metrics and other telemetry data associated with prior executed searches for a respective stack associated with the search head 510. For example, runtime telemetry store 514 can stores telemetry information of the last N searches for each search (e.g., variance computations for scheduled searches and search components) and use this historical runtime information to make determinations of whether a search or search component has degraded. With each execution of an incoming search, the runtime information and associated computations stored in the runtime telemetry store 514 can be updated, in part, to track more data points over time in order to make better decisions.

Keeping track of metrics for prior executed searches also enables the search head 510 to perform comparisons for new incoming searches. Metrics associated with an incoming search can be compared to metrics computed for historical executions of one or more searches to determine alerts. For example, a runtime associated with an incoming search can be compared to a baseline established by a search runtime variance for that search stored in the runtime telemetry store 514. Or, the runtime for the incoming search can be compared to a baseline established by a composite variance determined based on runtimes for an entire search population associated with a respective tenant.

In some implementations, the saved searches module 516 saves the searches that are scheduled to be executed over a period of time. As explained above, scheduled queries can be configured to execute the query once per hour, once per day, at a specific time, on a specific date, or at some other time that can be specified by a date, time, and/or frequency. In some implementations, the dispatch directory 530 stores information pertaining to the most recent searches (e.g., results of current searches, arguments presented to the most recent searches, etc.) In some implementations the information stored in dispatch directory 530 may also contain telemetry information for the most recent searches stored in a JavaScript Object Notation (JSON) format. It should be noted that the runtime telemetry store 514, the saved searches module 516 and the dispatch directory 530 may overlap, partially or completely, in their functionality. For example, telemetry data to be reported out to a provider entity can be stored in the dispatch directory 530 rather than the runtime telemetry store 514. Optionally, the dispatch directory 530 and runtime telemetry store 514 can be combined into the same module.

The storage 504 may be a disk drive storage device. Although shown as a single unit, the storage 504 may be a combination of fixed and/or removable storage devices, such as fixed disc drives, floppy disc drives, tape drives, removable memory cards, or optical storage, network attached storage (NAS), or a storage area-network (SAN). The processor 503 communicates to other computing devices and systems via the network interface 508, where the network interface 508 is configured to transmit and receive data via one or more networks 542 (e.g., 542(1), 542(2), etc.).

The interconnect 511 facilitates transmission, such as of programming instructions and application data, between the processor 503, the input/output (I/O) device interface 506, the storage 504, the network interface 508, and the system memory 512. The I/O device interface 506 is configured to receive input data from I/O devices 544. For example, the search head 510 can be connected to a display terminal, keyboard and/or mouse to allow a user direct operational control over the search head (e.g., for example when the search head is part of an on-prem installation).

Secure communications between the search head 510 and the monitoring application are enabled via network 542(2). Further, secure communications between the search head 510 and the client device 540 may be enabled through network 542(1). In various implementations, the network 541(1) and 541(2) may be portions of the same network or may include one or more shared network components that communicate with each of the networks 542(1) and 542(2).

Monitoring Search Performance for Scheduled Searches at the Search Level

As mentioned earlier, search performance, at the search level is monitored by identifying and tracking a metric that is timely and reliable enough so that performance issues can be captured before a customer or tenant (e.g., a subscriber entity of a cloud-based stack 406 in the cloud deployment 404 as discussed above in connection with FIG. 4) notices, thereby, giving the provider entity (e.g., the entity operating cloud deployment 404) sufficient time to plan a remedial response.

Figure 6:
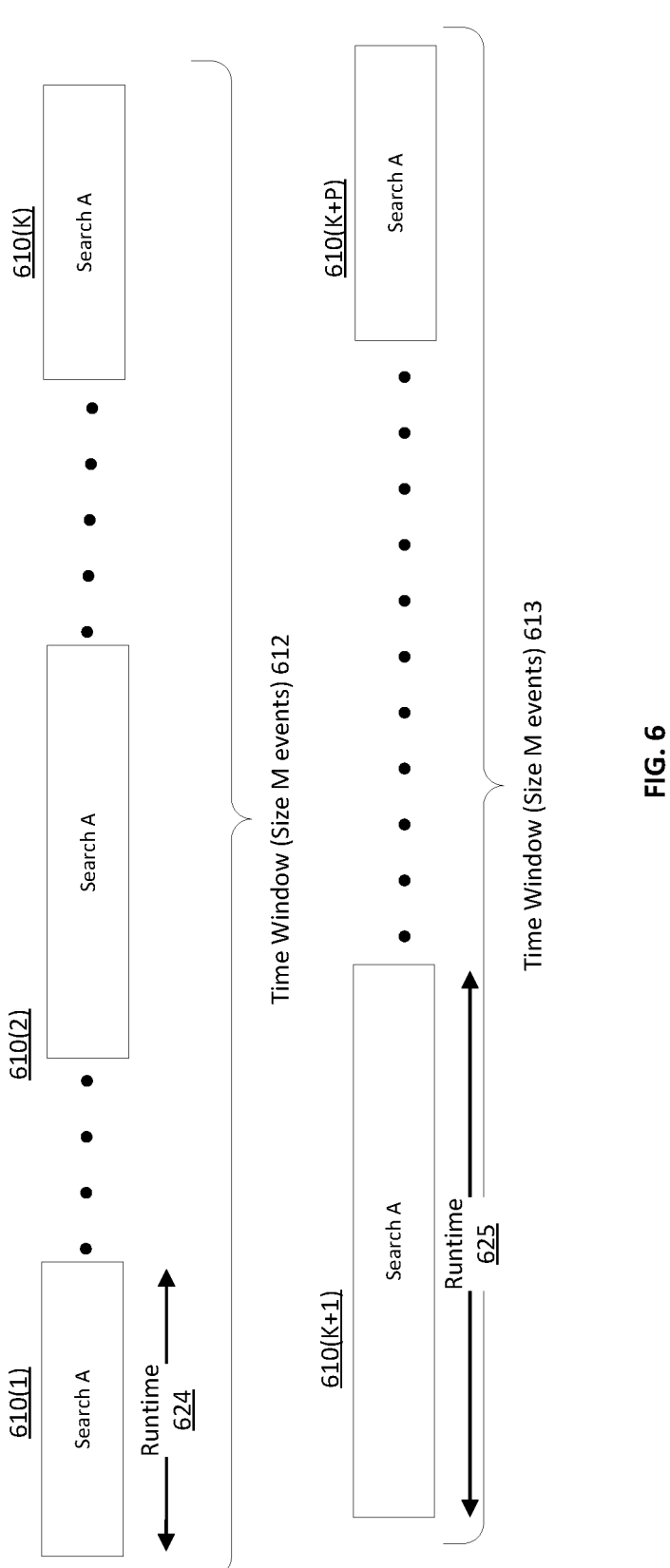
FIG. 6 illustrates the manner in which the performance of a single scheduled search is tracked, in implementations according to the present disclosure.

FIG. 6 illustrates the manner in which the performance of a single scheduled search is tracked, in implementations according to the present disclosure. As shown in FIG. 6, Search A 610 (e.g., 610(1), 610(2), . . . 610(K)) executes K times during a time window 612, where the time window 612 comprises M events. Where Search A 610 is the only search that is executing during time window 612, then K can be equivalent to M. Simply tracking the search runtime 624 for a single instance of the Search A (e.g., 610(1)) is insufficient because a search runtime for a single instance of a search is too noisy of a metric on which to base evaluation of search performance.

Accordingly, implementations according to the present disclosure track search performance by computing a runtime variance of a scheduled search during a window of time of size M events by taking into account a history of N prior executions that fall within the window. In other words, the runtime variance of the Search A 610 would be computed using the runtimes of N instances of the Search A 610 from K executions in time window 612. In some implementations, the variance computation may also take into account runtimes during previous windows.

In some implementations, N can be equivalent to K, where the variance computation can take into account all K executional instances of the Search A 610 within the time window 612. For example, where N=K, runtimes associated with each of the Search A 610 executions within time window 612 can be used to compute the variance. Accordingly, using a statistical measure like variance, a composite metric is computed that provides a customer with more meaningful information regarding the performance of the Search A 610. It should be noted that any other type of statistical measure besides variance can also be used that uses previous search runtimes for the same search to compute a metric that provides a customer with more meaningful context of search performance.

In some implementations, the computed variance is saved in the runtime telemetry store 514 of FIG. 5 where the metric can be used, among other things, for performing comparisons of runtimes between incoming instances of Search A and the computed variance for the Search A 610. In some implementations, the Search A 610 is a scheduled search that runs periodically and is stored in the saved searches module 516 of FIG. 5.

As shown in FIG. 6, the Search A 610 can continue to execute in a subsequent time window 613 where the performance of the Search A 610 can be compared with the variance in the time window 612. For example, Search A 610(K+1) executes during the time window 613 and continues to execute a total number of P times during the time window 613, where Search A 610(K+P) is the last execution of the Search A 610 in the time window 613. For each instance of Search A during the time window 613, a search runtime of the search instance can be compared to a baseline established by the variance computed during the time window 612 and stored in a runtime telemetry store. For example, the search head 510 of FIG. 5 can track whether a runtime (e.g., runtime 625) associated with a particular instance of scheduled Search A 610 (e.g., 610(K+1)) exceeds a threshold determined based on a variance computed using the prior N executions of the Search A 610 from the time window 612. If the runtime 625 is not within an acceptable range or above a predetermined threshold, a flag or alert can be asserted. This flag can, for example, be a Boolean value that is written to disk in the runtime telemetry store 514 where a history of whether a particular instance of a search is in a degraded state can be persisted. This Boolean value can either be reported to the monitoring application 502 or queried by the monitoring application 502 as needed.

Furthermore, counts of the number of times the Boolean value associated with a given search (e.g., the Search A 610) is asserted can also be maintained in the runtime telemetry store 514 at the search head 510 and reported out to the monitoring application 502 periodically (or queried by the monitoring application 502 as needed). Because the monitoring application 502 may be managing multiple stacks (e.g., multiple cloud-based stacks 406 as shown in FIG. 4), it is advantageous to reduce the processing load on the monitoring application 502 by performing the computationally intensive calculations at the search head 510 for a given stack and reporting a single Boolean value or a count of Boolean values (for a given time duration) in response to a search degradation.

It should be noted that the variance and other telemetry data for search queries run by a customer of a particular stack are computed on a search head (e.g., search head 510) in a stack (e.g., cloud-based stack 406 of FIG. 4) associated with the customer rather than by any computing device in the cloud deployment 404 of FIG. 4 that is not associated with the particular stack. Similarly, telemetry data and other metrics computed in association with searches run by a customer can be stored in the runtime telemetry store (e.g., runtime telemetry store 514) associated with the search head in the stack designated to the customer. In this way, executing searches, computing statistics associated with the searches and storing the telemetry data, all of which require considerable processing and memory resources, are performed "on the edge" of the cloud deployment 404. Stated differently, the computational load to execute the queries and compute statistics, and the storage load to save the telemetry results associated with the queries is borne by the computing devices that are dedicated to particular subscriber entity in the cloud (e.g., computing devices in a cloud-based stack 406). This reduces the computational load on the monitoring application 402 and other elements of the cloud deployment 404 that are not associated with a given subscribing entity.

In some implementations, the search head 510 of FIG. 5 can also transmit the computed variance for a given sched-uled search to the monitoring application 502. This can be done, for example, in response to a query from the monitoring application 502. For example, a provider entity may need to view the variance for a given search charted over a particular time duration.

Figure 7:
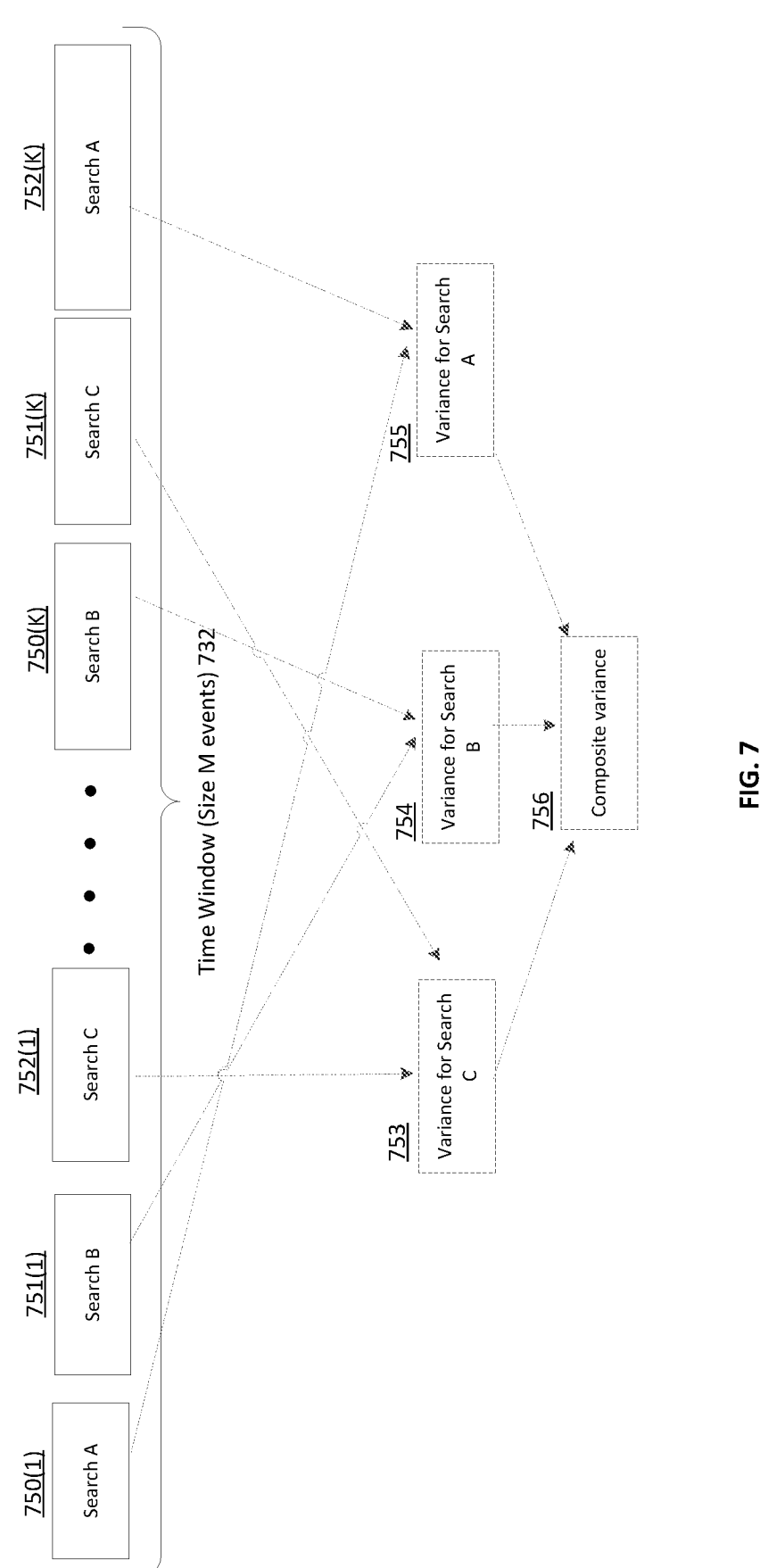
FIG. 7 illustrates the manner in which the performance of multiple schedules search can be tracked using a composite metric, in implementations according to the present disclosure.

FIG. 7 illustrates the manner in which the performance of multiple scheduled searches can be tracked using a composite metric, in implementations according to the present disclosure. As shown in FIG. 7, Search A 750 (e.g., 750(1) . . . 750(K)), Search B 751 (e.g., 751(1) . . . 750(K)), and Search C 752 (e.g., Search 752(1) . . . . Search 752(K)) each execute K times during a time window 732, where time window 732 comprises M events.

In certain circumstances, a customer or subscribing entity associated with a stack (e.g., cloud-based stack 406 in FIG. 4) executes multiple different searches during a given time window. The search performance for each search can be tracked individually using the methodology discussed in connection with FIG. 6. However, in certain situations, a provider entity (e.g., a provider of cloud deployment 404 in FIG. 4) needs to track how searches are performing as a whole for the customer. For these situations, a composite metric (e.g., a composite variance) can be determined for a search population as a whole.

In some implementations, in order to determine a composite metric that tracks the performance of a search population as a whole, runtime variances (or other statistical metrics) can first be computed for each of the searches in the set of searches individually. Referring to FIG. 7 again, for example, a runtime variance (or other statistical metric) of each scheduled search during time window 732 is computed by taking into account a history of N prior executions of the search that fall within the window. Note, that as explained above, N can either be less than or equal to K. In certain cases, however, the variance computation may also take into account execution runtimes from previous windows of time.

In the example of FIG. 7, a variance for Search C 753, a variance for Search B 754 and a variance for Search A 755 are computed using the runtimes from executions of the respective searches during the time window 732. Additionally, in some implementations, the variances for Search A, Search B and Search C can be collapsed down into a single metric and used to compute a composite variance 756 (or other metric), as shown in FIG. 7. The composite variance 756 provides a general performance baseline for a search population associated with a respective tenant.

In some implementations, Search A 750, Search B 751 and Search C 752 are scheduled searches that runs periodically and are stored in the saved searches module 516 of FIG. 5. Further, the computed variances for the individual searches and the composite variance metric can be stored in the runtime telemetry store 514. In some implementations, the composite variance 756 can be reported to the monitoring application 502 which can keep track of composite variance metrics from various tenants to compare search performance between the tenants.

In some implementations, the search head 510 tracks whether a runtime associated with an incoming instance of a search in a duration subsequent to the time window 732 exceeds a threshold determined based on the composite variance 756 and asserts an alert or flag responsive to a violation. This flag can, for example, be a Boolean value that is written to disk in the runtime telemetry store 514 where the history of whether a particular instance of a search is in a degraded state can be persisted. This Boolean value can either be reported to the monitoring application 502 or queried by the monitoring application 502 as needed. This allows the provider entity to determine how searches in general are performing for the associated stack. In some implementations, the monitoring application 502 maintains an aggregate of the number of violations reported out for each stack.

In some implementations, a count of alerts is tracked by the search head 510 and reported out to the monitoring application periodically. This precludes the provider entity from needing to process alerts individually. As clarified above, computations for executing searches and the storing of telemetry data, both of which require considerable processing and memory resources, are performed at the stacks on the edge of the cloud deployment 404. As noted above, the monitoring application 502 needs its resources freed up to track the performance of potentially thousands of subscribing entities.

Figure 8:
FIG. 8 illustrates the manner in which a composite variance associated with scheduled searches executing on a stack can be displayed in a GUI, in implementations according to the present disclosure.

FIG. 8 illustrates the manner in which a composite variance associated with scheduled searches executing on a stack can be displayed in a GUI, in implementations according to the present disclosure. In some implementations, a GUI 800 displays a graph of the composite variance 810 tracked for scheduled searches running on, for example, a cloud-based stack 406 of FIG. 4.

In some implementations, a composite variance for scheduled searches can be computed and reported to the monitoring application 402 for either searches running on a cloud-based stack 406 or searches running on an on-prem stack 408. The monitoring application 402 can keep track of the composite variances for a number of tenants on the cloud deployment 404.

The composite variance 810 provides a quick overview of the manner in which searches are performing in general for the associated stack. The graph of the composite variance 810, for example, allows the provider of an entity or even a subscribing entity to easily monitor the performance of a search population for a given stack visually and identify irregular events. The GUI 800 can be displayed either on a device associated with the subscribing entity (e.g., client device 540 of FIG. 5) or on a device associated with the provider entity that receives information from the monitoring application 502 of FIG. 5. For example, the provider entity can investigate circumstances surrounding the spike 812 in the composite variance by, for example, reviewing the types of searches executing at a corresponding time identified on timescale 814.

Displaying a graph of the composite variance 810 also allows the provider to identity periods of time during which the scheduled searches are behaving roughly as expected. For example, time window 818 is a period of relatively stable activity.

In some implementations, the GUI 800 also displays a CPU utilization graph 811 corresponding to the graph of composite variance 810. Displaying graphs for the variance and the CPU utilization alongside each other serves as a good predictor of why searches on the system are running slower than expected during times of load. For example, a provider entity can analyze both graphs to identify if the spikes in the graph for composite variance 810 were caused by increased CPU utilization. As seen in the GUI 800, the spike 812 in the variance corresponds to an equivalent spike 813 in CPU utilization. Where a spike in the graph of composite variance 810 does not correspond to a time period of increased CPU utilization, a provider entity can surmise that the irregularity in search performance can be attributed to factors other than CPU utilization.

In some implementations, using the composite variance or metric associated with each tenant, the performance of several different tenants being serviced by the provider of the cloud deployment 404 can be compared at the monitoring application 402. For example, the GUI 800 can also be populated with graphs of the composite variance for several different tenants so that the provider can easily compare the search performance for the various tenants and determine periods of increased load for each tenant. In this manner, the problems associated with higher priority tenants or tenants experiencing more severe performance degradations can be triaged by the provider. Implementations of the search system disclosed herein also prevent exerting a high computational load on the monitoring application 502 of FIG. 5 by allowing most of the computations for determining the composite variance to take place on computing devices within a customer stack. This prevents bogging down computing devices associated with the monitoring application 502 (controlled by the provider entity) with an excessively high load.

Monitoring Search Performance for Scheduled Searches at the Component Level

There can be a multitude of factors resulting in degraded performance for a search. Search queries can be customized and complex with various levels of nesting within a single query especially with a search system (e.g., search system 160) that can apply a schema to the data at search time (a late-binding schema technique). Further, each query can comprise multiple commands or components, where each command is qualified with many different options. It is, therefore, challenging to determine how a query should perform or where to begin diagnosing degradations being experienced in a query.

As noted previously, implementations of a search system of a data intake and query system address the challenge of isolating a degradation in search runtime to one or more of several factors by monitoring searches at a more granular level. Simply analyzing search runtime values or statistics can in certain circumstances result in noisy metrics. Accordingly, finer-grained information is needed that provides a better overview of which component of a search is contributing the most to the degraded overall performance of a search.

A scheduled search can be comprised of one or more components. Note that while a search command included in a search query can be a component of a search query, a search component is not limited to only search commands included in a query. A search component can, for example, be involved in setting up an infrastructure for a search but not included explicitly as a command within the search query.

Implementations of the search system allow search performance to be tracked at the level of the search component. For example, implementations of the search system are able to measure and flag search performance at a component level and identify any component within a search that is degraded or responsible for the degraded performance of the search. Further, the search system is able to rank these components in decreasing order of impact to the search performance.

In some implementations, in order to track the components of a search, a unique identifier is associated with each component of the search. This unique identifier is used to correlate the performance of the same component across various executions of the search. Each execution of an instance of a search is an event that generates event data. The event data can, in some implementations, be recorded in a structured data format, for example, a JavaScript Object Notation (JSON) object. It should be noted that other file formats besides JSON can also be used. The JSON object comprises metadata associated with the search execution (e.g., search duration for each search command in the search, a telemetry identifier for each search command in the search, etc.)

Figure 9:
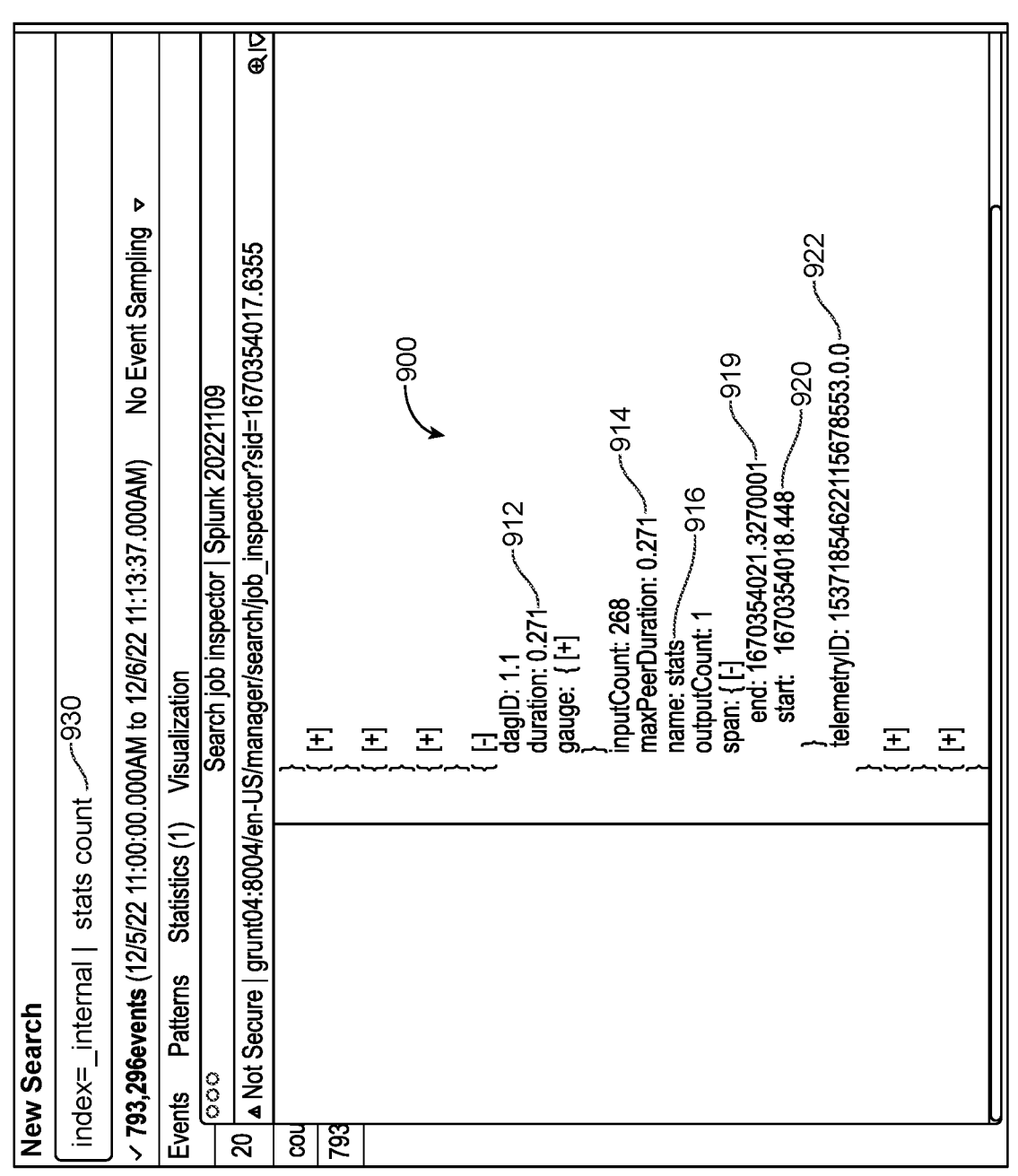
FIG. 9 illustrates exemplary event metadata generated in response to an execution of a search query, in implementations according to the present disclosure.

FIG. 9 illustrates exemplary event metadata generated in response to an execution of a search query, in implementations according to the present disclosure. As noted above, for each instance of a search query that is executed, an event with associated event metadata is created. When query 930 of FIG. 9 executes, the metadata generated may be outputted using a structure data format, for example, as part of a JSON object 900. The JSON object 900, among other things, provides telemetry data including metrics about the search. The JSON object 900 further includes telemetry data for each search command (which is a component of the query 930) invoked by the query. For example, the JSON object 900 provides the duration 912 of the search command, the name of the search command (e.g., stats) 916, an end time 919 and a start time 920 for spans associated with the search command, and a telemetry identifier 922. Note that a span can be a named, timed operation, for example, a search representing a piece of the workflow. In one implementation, each JSON object generated for a particular execution of a search can be saved in the runtime telemetry store 514 or in the dispatch directory 530 shown in FIG. 5.

Each search command or component in a query is associated with a unique telemetry identifier. Referring to FIG. 9, for example, the search command "stats" in query 930 can be assigned the telemetry identifier "15371854622115678553.0.0" as shown in FIG. 9. In some implementations, the telemetry identifier is a tuple, where the prefix of the identifier is assigned to a search query (e.g., the query 930) as a whole so that each component of the search is assigned the same prefix. For example, assuming the query 930 contained multiple search commands, each command in the query would be assigned the same prefix "15371854622115678553." The search commands in the same query are, however, distinguished from each other using the subfix of the identifier. For example, the subfix of the identifier tuple can contain a positional identifier to identify the location of a search command or component within the search query. For example the subfix "0.0" in the query 930 may contain information regarding a position of the "stats" command in the query 930 (e.g., the positional identifier may correspond to a node in a tree created based on the search query). Because the query 930 is a simply query containing only a single command, the positional identifier associated with the "stats" command in query 930 contains zeroes. While the query 930 only comprises a single search command (e.g., search command "stats"), one of ordinary skill in the art would appreciate that a typical search query can be complex and can comprise several different search commands (where each search command is considered a component of the query).

Using the unique telemetry identifier assigned to each command, the performance of a search component or command (e.g. "stats") can be correlated and tracked across multiple executions of the query (e.g., query 930) across a stack. Because the telemetry identifier for a command stays stable across multiple executions of the same command, performance statistics can be accumulated across the multiple executions and compared.

For example, a search runtime variance (or any other statistical computation taking into account historical values) can be computed for a search component or command (e.g., the "stats" command) using data collected from prior executions. For example, using prior execution runtimes for a component stored in a runtime telemetry store (e.g., runtime telemetry store 514 in FIG. 5), a variance can be computed using a prior K executions of a given search component (e.g., the "stats" command). The search runtime variance for a search component is computed in the same manner as scheduled searches, as described in connection with FIGS. 6 and 7.

Subsequently, a runtime of a current execution of the same search command can be compared with the search runtime variance to determine if the current execution of the search command is within an acceptable range of values. Additionally, in some implementations, using the telemetry identifier, the performance of the search command with the unique telemetry identifier can also be tracked across an entire fleet of tenants that utilize the same search command.

In some implementations, variances associated with these components can be reported by a search head to a provider entity in control of a monitoring application (e.g., in response to a query from a monitoring application). The variances can be presented to a user associated with the provider entity in a graphical format as shown in FIG. 10.

In addition to correlating search components across queries, the unique identifiers allow the performance of search components to be correlated and tracked over time. In some implementations, metrics and other telemetry data (e.g., search runtimes) associated with components of a search query are computed and correlated with metrics from prior executions in time of the same search using the unique telemetry identifiers in order to generate new metrics. For example, a maximum peer duration metric 914 can be computed by comparing execution times of the search component across a range of queries over a given time duration.

As noted above, using telemetry identifiers, implementations of the search system, are able to compare search telemetry metrics for search components or commands across multiple queries executed by the same stack or even across multiple stacks. This is particularly advantageous in circumstances where the queries are complex and contain multiple search commands or components. Being able to compare telemetry metrics for components provides both the subscribing entity and the provider of a cloud-based stack more granular insight into where search degradation is taking place. Identifying a degrading component allows a customer, for example, to drill down more precisely and identify any memory or CPU utilization issues relating to the failing component.

Figure 10:
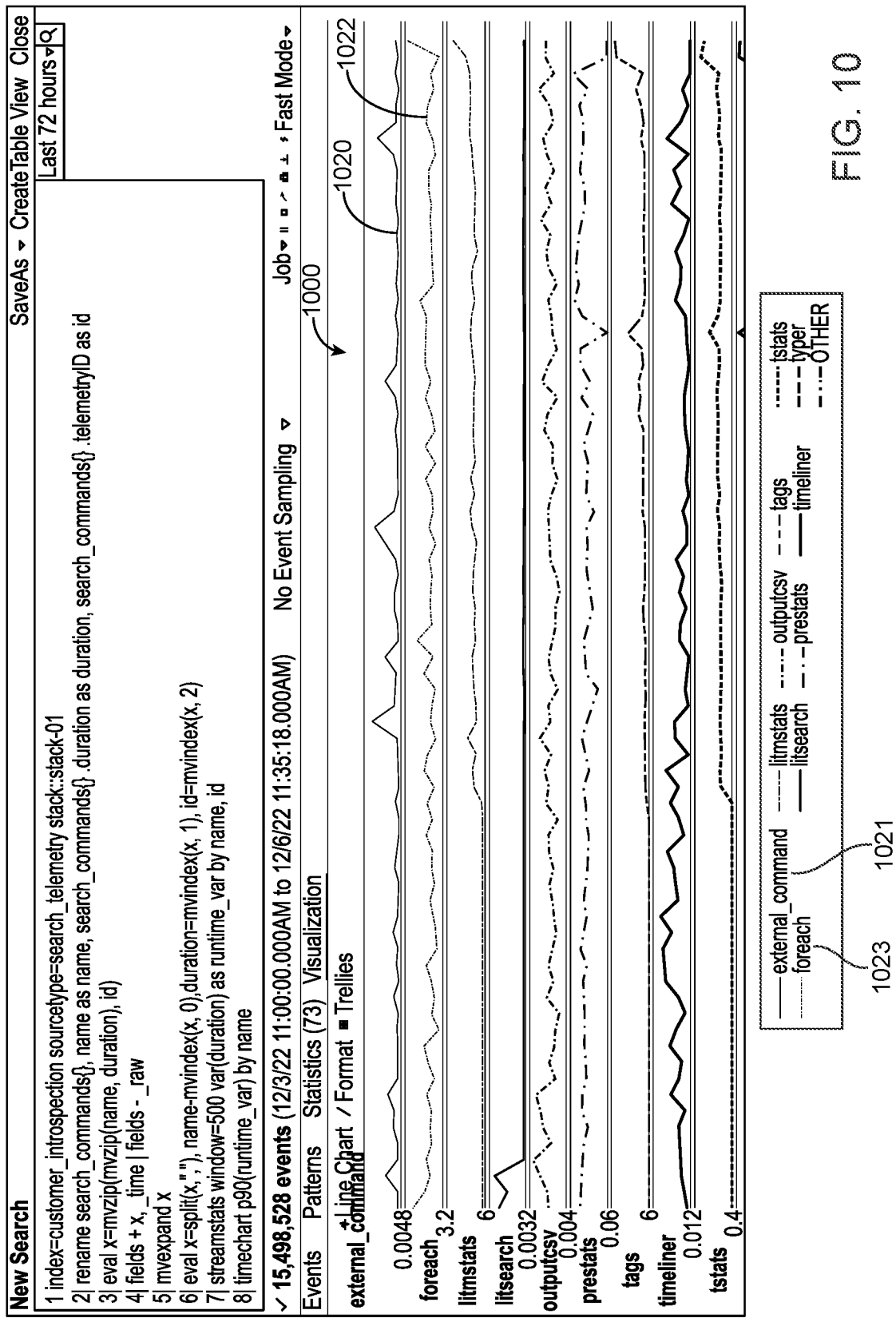
FIG. 10 illustrates the manner in which variances associated with various search components executing on a stack can be tracked and displayed, in implementations according to the present disclosure.

FIG. 10 illustrates the manner in which variances associated with various search components executing on a stack can be tracked and displayed, in implementations according to the present disclosure. In some implementations, a GUI 1000 displays variances assorted with various search components (e.g., variance 1020 associated with search component "external_command" 1021, variance 1022 associated with search component "foreach" 1023). The GUI 1000 can be displayed either on a device associated with the subscribing entity (e.g., client device 540 of FIG. 5) or on a device associated with the provider entity that receives information from the monitoring application 502 of FIG. 5. In some implementations, instead of displaying variances for each search component executed by a particular stack separately, a composite variance may be computed for all the search components and reported to the monitoring application 502. As clarified above, computations for executing searches and the storing of telemetry data, both of which require considerable processing and memory resources, can be performed on the edge of the cloud deployment 404 of FIG. 4.

In some implementations, each time a search component is executed by itself or within a complex query, a runtime for a respective instance of the search component (e.g., the "stats" command) in a query can be compared to a stored historical variance associated with the search component (stored in, for example, a runtime telemetry store 514 of FIG. 5). In some implementations, an alert is flagged if the runtime exceeds the stored variance value. The alert can be stored in a runtime telemetry store at a search head or transmitted to a monitoring application for a provider entity to track. Note again that all such computations associated with determining search runtimes, computing variances and flagging alerts are performed on the edge of the cloud deployment 404 of FIG. 4. The monitoring application 402 can, therefore, easily track if the particular search component for which the alert is flagged is experiencing problems. For example, the monitoring application 402 would simply need to track the Boolean flags received from the various stacks and aggregate a number of violations for each failing search component.

In some implementations, a search head storing the alerts can maintain counts for a number of times an alert for a given search component is flagged. These counts can then be reported to the monitoring application 402 periodically. Receiving a count of the alerts associated with the search components prevents the monitoring application 402 from needing to aggregate the Boolean values associated with each search component and further reduces computational load.

In some implementations, the monitoring application 402 of FIG. 4 monitors the health and performance of multiple tenants or subscriber entities (e.g., associated with cloud-based stack(s) 406) in the cloud computing environment and, for each tenant, keeps track of how many search components are degrading. For example, the monitoring application receives, from each stack, a count for the number of times a metric (e.g., a runtime) associated with a particular search component spikes above a threshold (or is outside the bounds of what is considered acceptable) during a given time window or for a given number of executions of the same search. By maintaining a separate count of violations for each search component, the monitoring application 402 can track the search components that are experiencing severe degradations for each tenant.

In some implementations, the monitoring application 402 keeps track of an aggregated number of times a particular search component flags an alert for a given stack. In some implementations, the monitoring application 402 keeps track of an aggregated number of times a particular search component flags an alert across an entire fleet of stacks. In certain circumstances, the provider entity may have different teams of IT personnel in charge of diagnosing issues related to different search components. Aggregating violations separately for each search component across a fleet allows the provider entity to alert the correct team of IT personnel when violations for search components they are in charge of servicing exceed a given threshold.

In some implementations, the monitoring application 402 can track search performance at the stack level too. For example, the monitoring application 402 can also aggregate the number of violations for all the search components associated with each tenant to determine which customer is experiencing the highest number of failing components. This allows the provider entity to direct resources to customers that are the most important or experiencing the highest number of failures. In some implementations, the provider entity can also sort the various stacks based on how many violations each stack is experiencing in order to triage problems more efficiently.

Figure 11:
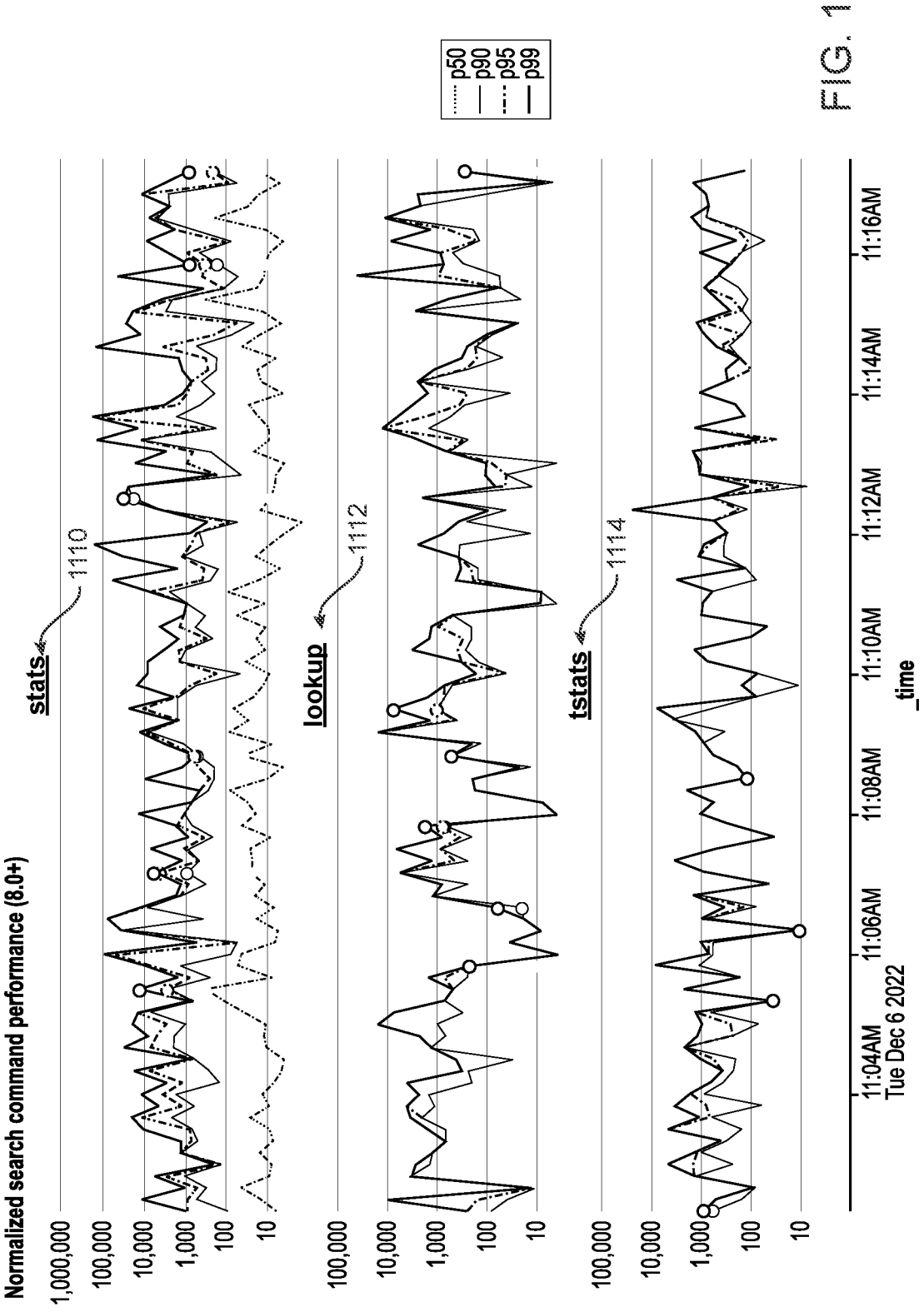
FIG. 11 illustrates the manner in which search performances for each component of a complex search query can be visualized separately in a GUI, in implementations according to the present disclosure.

FIG. 11 illustrates the manner in which search performances for each component of a complex search query can be visualized separately in a GUI, in implementations according to the present disclosure. As noted above, certain complex queries can comprise multiple search components. Using telemetry identifiers, performance for each component of a search can be tracked separately. For example, a complex query can comprise a "stats" command 1110, a "lookup" command 1112 and a "tstats" command 1114. Because each command is associated with a unique telemetry identifier, its performance can be tracked separately from the other components.

Figure 12:
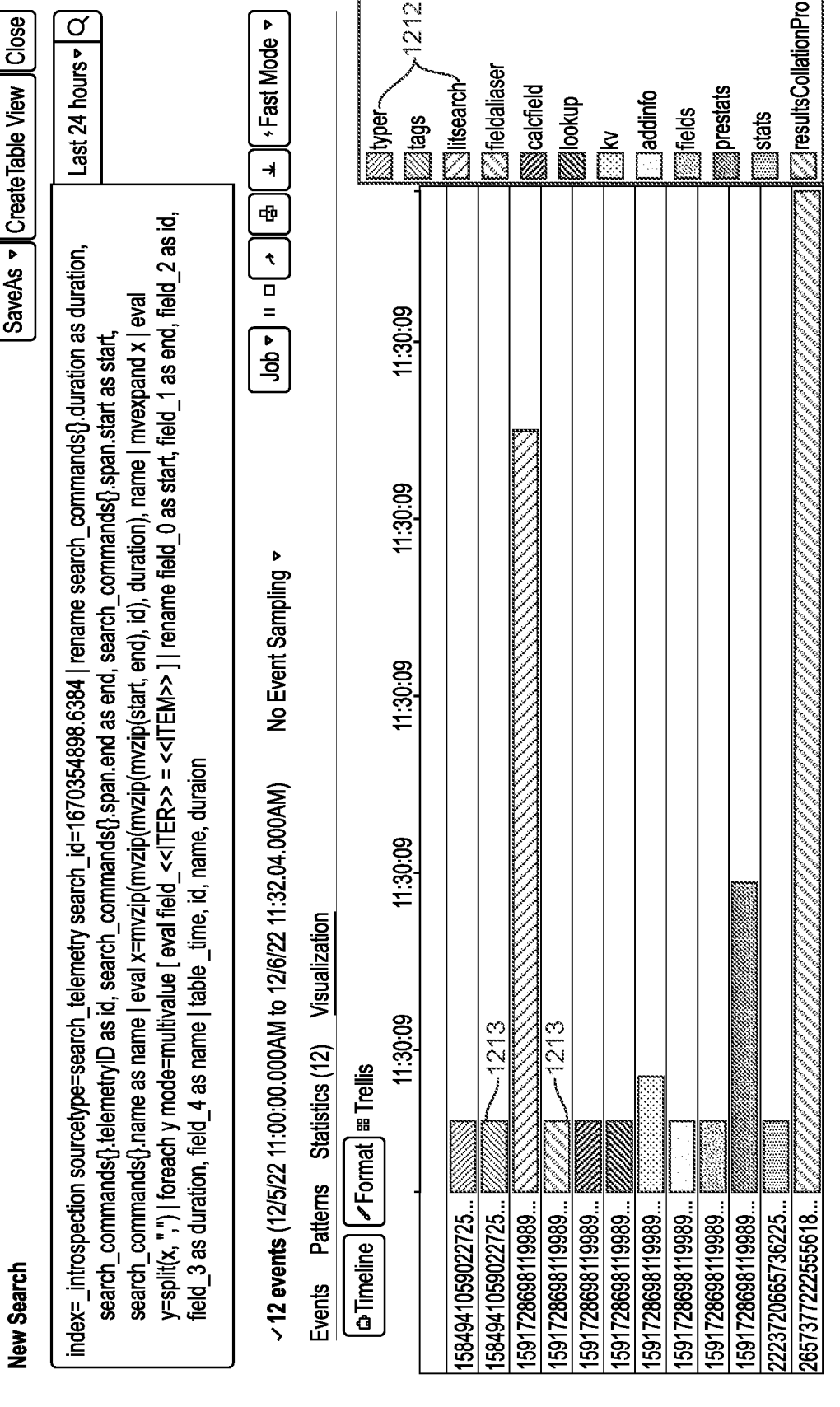
FIG. 12 illustrates the manner in which search runtimes for each component of a complex search query can be visualized as spans, in implementations according to the present disclosure.

FIG. 12 illustrates the manner in which search runtimes for each component of a complex search query can be visualized as spans, in implementations according to the present disclosure. As discussed in connection with FIG. 9, an end time 919 and a start time 920 for spans associated with each search command can be tracked in a JSON object 900. As shown in FIG. 12, in some implementations, for complex queries containing several search components, a span diagram can be generating illustrating a start and end time for the various search components 1212 in the search. The span diagram comprises spans showing a start time and an end time for each of the spans associated with a component of the search.

FIG. 13 is a flowchart illustrating an example of a computer-implemented method of tracking and reporting a search performance for an incoming search, in implementations according to the present disclosure. The example process 1300 can be implemented, for example, by a computing device that comprises a processor and a non-transitory computer-readable medium. The non-transitory computer readable medium can be storing instructions that, when executed by the processor, can cause the processor to perform the operations of the illustrated process 1300. Alternatively or additionally, the process 1300 can be implemented using a non-transitory computer-readable medium storing instructions that, when executed by one or more processors, cause the one or more processors to perform the operations of the process 1300 of FIG. 13.

At block 1302, for a first time duration, a search head (e.g., search head 510) computes a search runtime for a plurality of executions associated with a first search. The first search can be received from a customer or subscribing entity associated with a stack within which the search head is deployed.

At block 1304, for a first time duration, the search head computes a search runtime for a plurality of executions associated with a second search. The first search can also be received from the customer or subscribing entity associated with the stack within which the search head is deployed. In some implementations, the second search can be a different search from the first search.

At block 1306, the search head computes a statistic for the first search using search runtime values from the plurality of executions associated with the first search. As noted previously, the statistic can, for example, include a variance, mean or another statistic that takes into account historical runtimes for a given search.

At block 1308, the search head computes a statistic for the second search using search runtime values from the plurality of executions associated with the second search.

At block 1310, the search head computes a composite statistic using the statistic for the first search and the statistic for the second search. For example, as discussed above, a composite variance can be computed that combines the variance for both the first and second searches into a single metric.

At block 1312, the search head compares a search runtime for an incoming search to a threshold determined based on the composite statistic.

At block 1314, responsive to a determination that the search runtime for the incoming search exceeds the threshold based on the composite static, the search head reports the alert to a computing device in a cloud environment. For example, the search head can report the alert to the monitoring application 502 of FIG. 5, which is controlled by a provider entity of a cloud deployment of a data intake and query system.

FIG. 14 is a flowchart illustrating an example of a computer-implemented method of tracking and reporting search performance for components of a search query, in implementations according to the present disclosure. The example process 1400 can be implemented, for example, by a computing device that comprises a processor and a non-transitory computer-readable medium. The non-transitory computer readable medium can be storing instructions that, when executed by the processor, can cause the processor to perform the operations of the illustrated process 1400. Alternatively, or additionally, the process 1400 can be implemented using a non-transitory computer-readable medium storing instructions that, when executed by one or more processors, cause the one or more processors to perform the operations of the process 1400 of FIG. 14.

At block 1402, a search head (e.g., search head 510) executes a search query. In some implementations, the search query can be a scheduled search that is run periodically.

At block 1404, the search head computes a metric for one or more components of the search query in response to the executing. In some implementations, the metric computed can be a search runtime. In some implementations, more than one metric can be computed for each component. As explained previously in connection with FIG. 9, metrics associated with each component of a search query can be outputted in a JSON object (e.g., JSON object 900).

At block 1406, for each of the one or more components, the search head compares a respective metric for the component with a threshold value based on a statistic determined using prior executions of the search query. For example, the search runtime for a component can be compared to a runtime variance determined for the same component using prior executions of the search query, where the runtime variance can be stored, for example, in a runtime telemetry store (e.g., runtime telemetry store 514) for the search head.

At block 1408, responsive to determining that the respective metric is higher than the threshold value, the search head transmits an alert to a second computing device in a cloud computing environment. For example, the search head can report the alert to the monitoring application 502 of FIG. 5, which is controlled by a provider entity of a cloud deployment of a data intake and query system.

Figure 15:
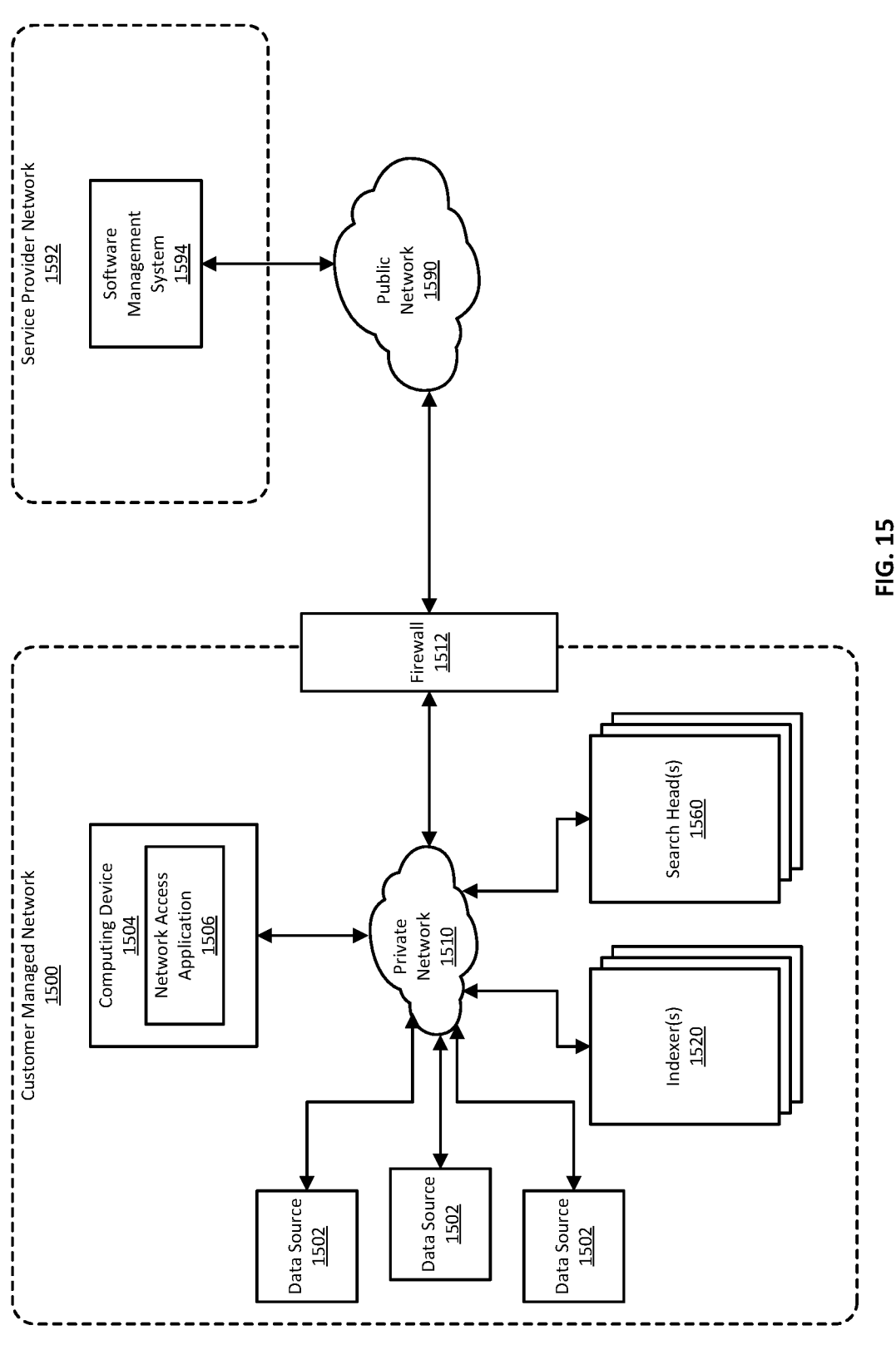
FIG. 15 illustrates an example of a self-managed network 1500 that includes a data intake and query system.

FIG. 15 illustrates an example of a self-managed network 1500 that includes a data intake and query system. "Self-managed" in this instance means that the entity that is operating the self-managed network 1500 configures, administers, maintains, and/or operates the data intake and query system using its own compute resources and people. Further, the self-managed network 1500 of this example is part of the entity's on-premise network and comprises a set of compute, memory, and networking resources that are located, for example, within the confines of an entity's data center. In some implementations, the self-managed network 1500 may be substantially similar to the optional on-prem stack 408 of FIG. 4. These resources can include software and hardware resources. The entity can, for example, be a company or enterprise, a school, government entity, or other entity. Since the self-managed network 1500 is located within the customer's on-prem environment, such as in the entity's data center, the operation and management of the self-managed network 1500, including of the resources in the self-managed network 1500, is under the control of the entity. For example, administrative personnel of the entity have complete access to and control over the configuration, management, and security of the self-managed network 1500 and its resources.

The self-managed network 1500 can execute one or more instances of the data intake and query system. An instance of the data intake and query system may be executed by one or more computing devices that are part of the self-managed network 1500. A data intake and query system instance can comprise an indexing system and a search system, where the indexing system includes one or more indexers 1520 and the search system includes one or more search heads 1560.

As depicted in FIG. 15, the self-managed network 1500 can include one or more data sources 1502. Data received from these data sources may be processed by an instance of the data intake and query system within self-managed network 1500. The data sources 1502 and the data intake and query system instance can be communicatively coupled to each other via a private network 1510.

Users associated with the entity can interact with and avail themselves of the functions performed by a data intake and query system instance using computing devices. As depicted in FIG. 15, a computing device 1504 can execute a network access application 1506 (e.g., a web browser), that can communicate with the data intake and query system instance and with data sources 1502 via the private network 1510. Using the computing device 1504, a user can perform various operations with respect to the data intake and query system, such as management and administration of the data intake and query system, generation of knowledge objects, and other functions. Results generated from processing performed by the data intake and query system instance may be communicated to the computing device 1504 and output to the user via an output system (e.g., a screen) of the computing device 1504.

The self-managed network 1500 can also be connected to other networks that are outside the entity's on-premise environment/network, such as networks outside the entity's data center. Connectivity to these other external networks is controlled and regulated through one or more layers of security provided by the self-managed network 1500. One or more of these security layers can be implemented using firewalls 1512. The firewalls 1512 form a layer of security around the self-managed network 1500 and regulate the transmission of traffic from the self-managed network 1500 to the other networks and from these other networks to the self-managed network 1500.

Networks external to the self-managed network can include various types of networks including public networks 1590, other private networks, and/or cloud networks provided by one or more cloud service providers. An example of a public network 1590 is the Internet. In the example depicted in FIG. 15, the self-managed network 1500 is connected to a service provider network 1592 provided by a cloud service provider via the public network 1590.

In some implementations, resources provided by a cloud service provider may be used to facilitate the configuration and management of resources within the self-managed network 1500. For example, configuration and management of a data intake and query system instance in the self-managed network 1500 may be facilitated by a software management system 1594 operating in the service provider network 1592. There are various ways in which the software management system 1594 can facilitate the configuration and management of a data intake and query system instance within the self-managed network 1500. As one example, the software management system 1594 may facilitate the download of software including software updates for the data intake and query system. In this example, the software management system 1594 may store information indicative of the versions of the various data intake and query system instances present in the self-managed network 1500. When a software patch or upgrade is available for an instance, the software management system 1594 may inform the self-managed network 1500 of the patch or upgrade. This can be done via messages communicated from the software management system 1594 to the self-managed network 1500.

The software management system 1594 may also provide simplified ways for the patches and/or upgrades to be downloaded and applied to the self-managed network 1500. For example, a message communicated from the software management system 1594 to the self-managed network 1500 regarding a software upgrade may include a Uniform Resource Identifier (URI) that can be used by a system administrator of the self-managed network 1500 to download the upgrade to the self-managed network 1500. In this manner, management resources provided by a cloud service provider using the service provider network 1592 and which are located outside the self-managed network 1500 can be used to facilitate the configuration and management of one or more resources within the entity's on-prem environment. In some implementations, the download of the upgrades and patches may be automated, whereby the software management system 1594 is authorized to, upon determining that a patch is applicable to a data intake and query system instance inside the self-managed network 1500, automatically communicate the upgrade or patch to self-managed network 1500 and cause it to be installed within self-managed network 1500.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A computer-implemented method, comprising:

executing a search query at a first computing device in a cloud computing environment;

computing a first runtime for a first component of the search query and a second runtime for a second component of the search query, wherein the first component comprises a first search command and the second component comprises a second search command;

comparing the first computed runtime for the first component with a first threshold value and the second computed runtime for the second component with a second threshold value, wherein the first threshold value for the first component is based on a respective statistic determined by correlating historical computed runtimes for the first component across prior executions of the search query using a unique identifier assigned to the first component;

responsive to determining that the first computed runtime is higher than the first threshold value or the second computed runtime is higher than the second threshold value, transmitting an alert to a second computing device in the cloud computing environment;

identifying, based on the alert, a cause of search degradation in association with a particular component of the search query;

for a plurality of subsequent executions of the search query, comparing a computed runtime for each of one or more components to a respective threshold value;

for each of the one or more components, maintaining a count associated with instances of runtimes for a respective component exceeding the respective threshold value; and reporting the count for each of the one or more components to the second computing device on a periodic basis.

2. The computer-implemented method of claim 1, wherein the respective statistic on which the first threshold value is based is a variance.

3. The computer-implemented method of claim 1, wherein the first computing device comprises a search head implemented in a stack in the cloud computing environment, wherein the stack comprises a group of computing devices dedicated to an entity with a subscription to utilize a portion of computing resources available in the cloud computing environment, and wherein the entity with the subscription submits the search query to the first computing device.

4. The computer-implemented method of claim 1, wherein the first computing device comprises a search head implemented in a stack in the cloud computing environment, wherein the stack comprises a group of computing devices dedicated to an entity with a subscription to utilize a portion of computing resources available in the cloud computing environment, and wherein the second computing device is controlled by a provider of the cloud computing environment and is separate from the group of computing devices in the stack.

5. The computer-implemented method of claim 1, wherein the first computing device comprises a search head implemented in a stack in the cloud computing environment, wherein the stack comprises a group of computing devices dedicated to an entity with a subscription to utilize a portion of computing resources available in the cloud computing environment, wherein the entity with the subscription submits the search query to the first computing device, wherein the second computing device is associated with a second entity providing the computing resources and separate from the group of computing devices in the stack, and wherein a monitoring application installed on the second computing device monitors a performance of searches executing on the stack.

6. The computer-implemented method of claim 1, wherein the first computing device is associated with a client of the cloud computing environment, wherein the second computing device is associated with a provider of the cloud computing environment, and wherein a monitoring application installed on the second computing device monitors a performance of searches executed on the first computing device.

7. The computer-implemented method of claim 1, wherein the respective statistic on which the first threshold value is based is a variance, and wherein the unique identifier assigned to the first component is consistent across multiple executions of the search query.

8. The computer-implemented method of claim 1, further comprising: at the second computing device, maintaining a count of alerts received from the first computing device for each of the one or more components.

9. The computer-implemented method of claim 1, further comprising:

at the second computing device, maintaining an aggregate count of alerts received from the first computing device; and comparing the aggregate count of alerts from the first computing device to a second count of alerts received from a third computing device, wherein the third computing device is associated with a first stack that is different from a second stack associated with the first computing device.

10. A computing system, comprising:

one or more processors; and one or more non-transitory computer-readable media having stored thereon instructions that, when executed by the one or more processors, cause the one or more processors to perform operations including:

executing a search query at a first computing device in a cloud computing environment;

computing a first runtime for a first component of the search query and a second runtime for a second component of the search query, wherein the first component comprises a first search command and the second component comprises a second search command;

comparing the first computed runtime for the first component with a first threshold value and the second computed runtime for the second component with a second threshold value, wherein the first threshold value for the first component is based on a respective statistic determined by correlating historical computed runtimes for the first component across prior executions of the search query using a unique identifier assigned to the first component;

responsive to determining that the first computed runtime is higher than the first threshold value or the second computed runtime is higher than the second threshold value, transmitting an alert to a second computing device in the cloud computing environment;

identifying, based on the alert, a cause of search degradation in association with a particular component of the search query;

for a plurality of subsequent executions of the search query, comparing a computed runtime for each of one or more components to a respective threshold value;

for each of the one or more components, maintaining a count associated with instances of runtimes for a respective component exceeding the respective threshold value; and reporting the count for each of the one or more components to the second computing device on a periodic basis.

11. The computing system of claim 10, wherein the respective statistic on which the first threshold value is based is a variance.

12. The computing system of claim 10, wherein the first computing device comprises a search head implemented in a stack in the cloud computing environment, wherein the stack comprises a group of computing devices dedicated to an entity with a subscription to utilize a portion of computing resources available in the cloud computing environment, and wherein the entity with the subscription submits the search query to the first computing device.

13. A non-transitory computer-readable medium having stored thereon instructions that, when executed by one or more processors, cause the one or more processor to perform operations including:

executing a search query at a first computing device in a cloud computing environment;

computing a first runtime for a first component of the search query and a second runtime for a second component of the search query, wherein the first component comprises a first search command and the second component comprises a second search command;

comparing the first computed runtime for the first component with a first threshold value and the second computed runtime for the second component with a second threshold value, wherein the first threshold value for the first component is based on a respective statistic determined by correlating historical computed runtimes for the first component across prior executions of the search query using a unique identifier assigned to the first component;

responsive to determining that the first computed runtime is higher than the first threshold value or the second computed runtime is higher than the second threshold value, transmitting an alert to a second computing device in the cloud computing environment;

identifying, based on the alert, a cause of search degradation in association with a particular component of the search query;

for a plurality of subsequent executions of the search query, comparing a computed runtime for each of one or more components to a respective threshold value;

for each of the one or more components, maintaining a count associated with instances of runtimes for a respective component exceeding the respective threshold value; and reporting the count for each of the one or more components to the second computing device on a periodic basis.

14. The non-transitory computer-readable medium of claim 13, wherein the respective statistic on which the first threshold value is based is a variance.

15. The non-transitory computer-readable medium of claim 13, wherein the first computing device comprises a search head implemented in a stack in the cloud computing environment, wherein the stack comprises a group of computing devices dedicated to an entity with a subscription to utilize a portion of computing resources available in the cloud computing environment, and wherein the entity with the subscription submits the search query to the first computing device.

16. The non-transitory computer-readable medium of claim 14, wherein the first computing device comprises a search head implemented in a stack in the cloud computing environment, wherein the stack comprises a group of computing devices dedicated to an entity with a subscription to utilize a portion of computing resources available in the cloud computing environment, and wherein the second computing device is controlled by a provider of the cloud computing environment and is separate from the group of computing devices in the stack.

17. The non-transitory computer-readable medium of claim 14, wherein the first computing device is associated with a client of the cloud computing environment, wherein the second computing device is associated with a provider of the cloud computing environment, and wherein a monitoring application installed on the second computing device monitors a performance of searches executed on the first computing device.

18. The non-transitory computer-readable medium of claim 14, wherein the respective statistic on which the first threshold value is based is a variance, and wherein the unique identifier assigned to the first component is consistent across multiple executions of the search query.

\* \* \* \* \*